United States Patent [19]

Merz

[11] Patent Number: 5,428,772

[45] Date of Patent: Jun. 27, 1995

[54] DATA PROCESSING SYSTEM PROVIDING USER INTERACTION IN MULTIPLE NATURAL LANGUAGES

[75] Inventor: Lauren Merz, Newton, Mass.

[73] Assignee: Prime Computer, Inc., Bedford, Mass.

[21] Appl. No.: 770,088

[22] Filed: Oct. 1, 1991

[51] Int. Cl.⁶ .................... G06F 17/28; G06F 17/30
[52] U.S. Cl. .......................... 395/600; 395/650;
364/419.01; 364/282.1; 364/974; 364/226.4;
364/920.4; 364/DIG. 1; 364/DIG. 2
[58] Field of Search ..................... 364/419, 919.01;
395/500, 145, 700, 575, 600, 650

[56] References Cited

U.S. PATENT DOCUMENTS

| | | | |
|---|---|---|---|
| 3,878,513 | 2/1972 | Werner | 395/400 |
| 4,566,078 | 1/1986 | Crabtree | 364/419 |
| 4,595,980 | 6/1986 | Innes | 364/419 |
| 4,615,002 | 9/1986 | Innes | 364/419 |
| 5,307,265 | 4/1994 | Winans | 364/419.01 |

FOREIGN PATENT DOCUMENTS 0531108 10/1993 European Pat. Off. ........ G06F 9/46

OTHER PUBLICATIONS

Kennelly, Cynthia. Digital Guide To Developing International Software. (Bedford, Mass.: Digital Press, 1991).

Primary Examiner—Thomas G. Black
Assistant Examiner—Paul R. Lintz
Attorney, Agent, or Firm—Wolf, Greenfield & Sacks

[57] ABSTRACT

A data processing system providing user interaction in multiple natural languages, including a processor for executing application programs and a memory for storing message files corresponding to the application program in at least one natural language and a link table for storing links between the application program and corresponding message files, wherein a link for an application program stores a natural language and a pointer to its message file, wherein the operating system for the processor establishes links when a message file is loaded into memory. The data processing system nests language information for nested application programs. A fall-back mechanism is used to provide a default language when a language desired by a user is not available or when nested languages are not available. The system may send and receive messages in multiple natural languages for multiple users using different application programs simultaneously in a manner transparent to the user and the application programmer with the assistance of the operating system involvement in establishing links, using default languages and nesting language information.

81 Claims, 29 Drawing Sheets

Fig.5

| PROGRAM₁ | ENGLISH | < LOCATION > |
| --- | --- | --- |
| PROGRAM₁ | FRENCH | < LOCATION > |
| PROGRAM₁ | GERMAN | < LOCATION > |
| ⋮ | ⋮ | ⋮ |
|  |  |  |

80 { | <1> | <FRENCH> |
| --- | --- |
|     | 82  84 |
| <2> | <GERMAN> |
| ⋮ | ⋮ |
| <N> | <LANGUAGE N> |

| | 91 | 93 |
| --- | --- | --- |
| 92 SYSTEM ENABLE (PRIVATE) | <1> | <1> |
| 94 DEFAULT LANGUAGE CODE | <-1> | <1> |
| 96 POINTER TO SYSTEM INFO | <null> | <ptr> |

DEFAULT OS
LANGUAGE CODE
FOR USER_N

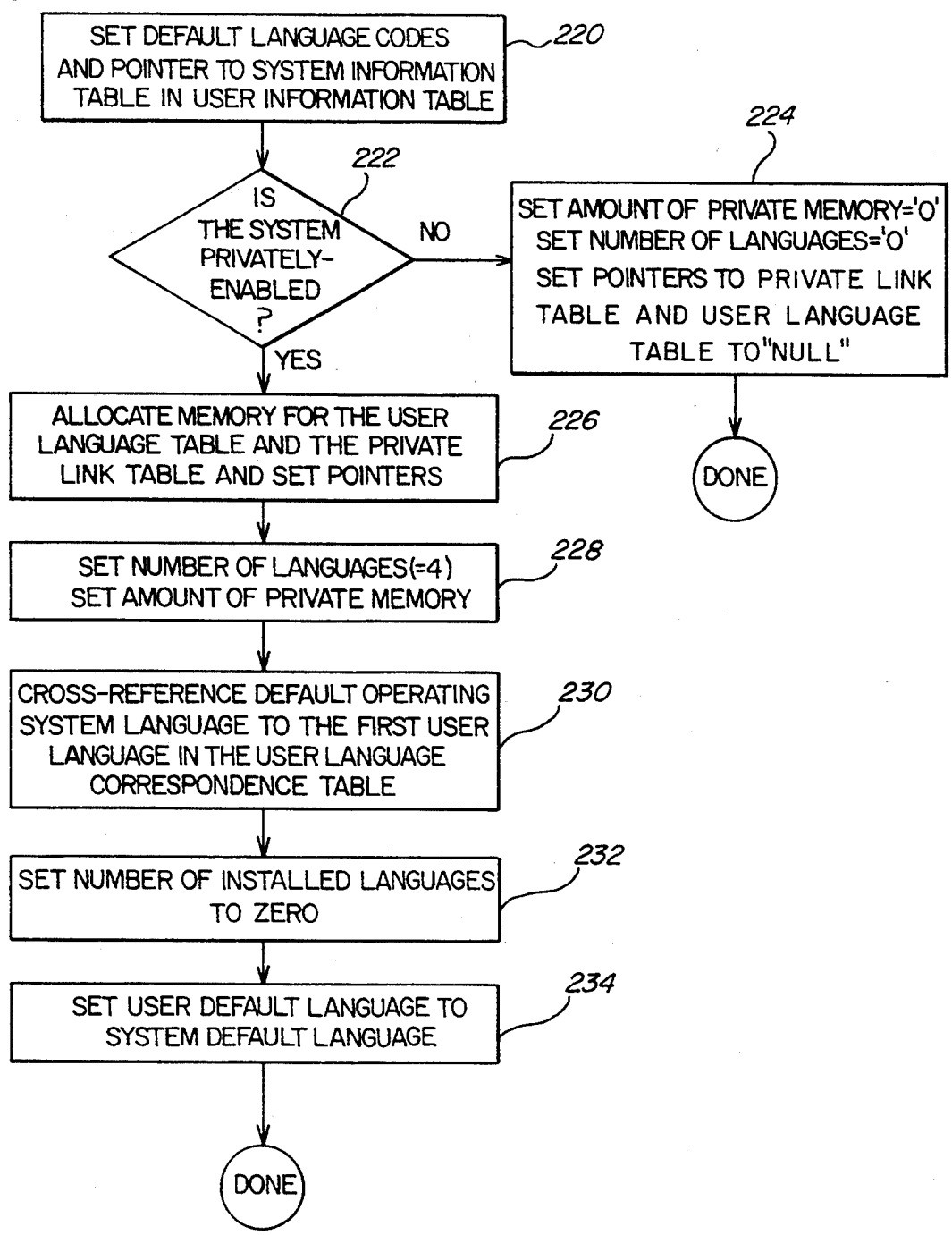

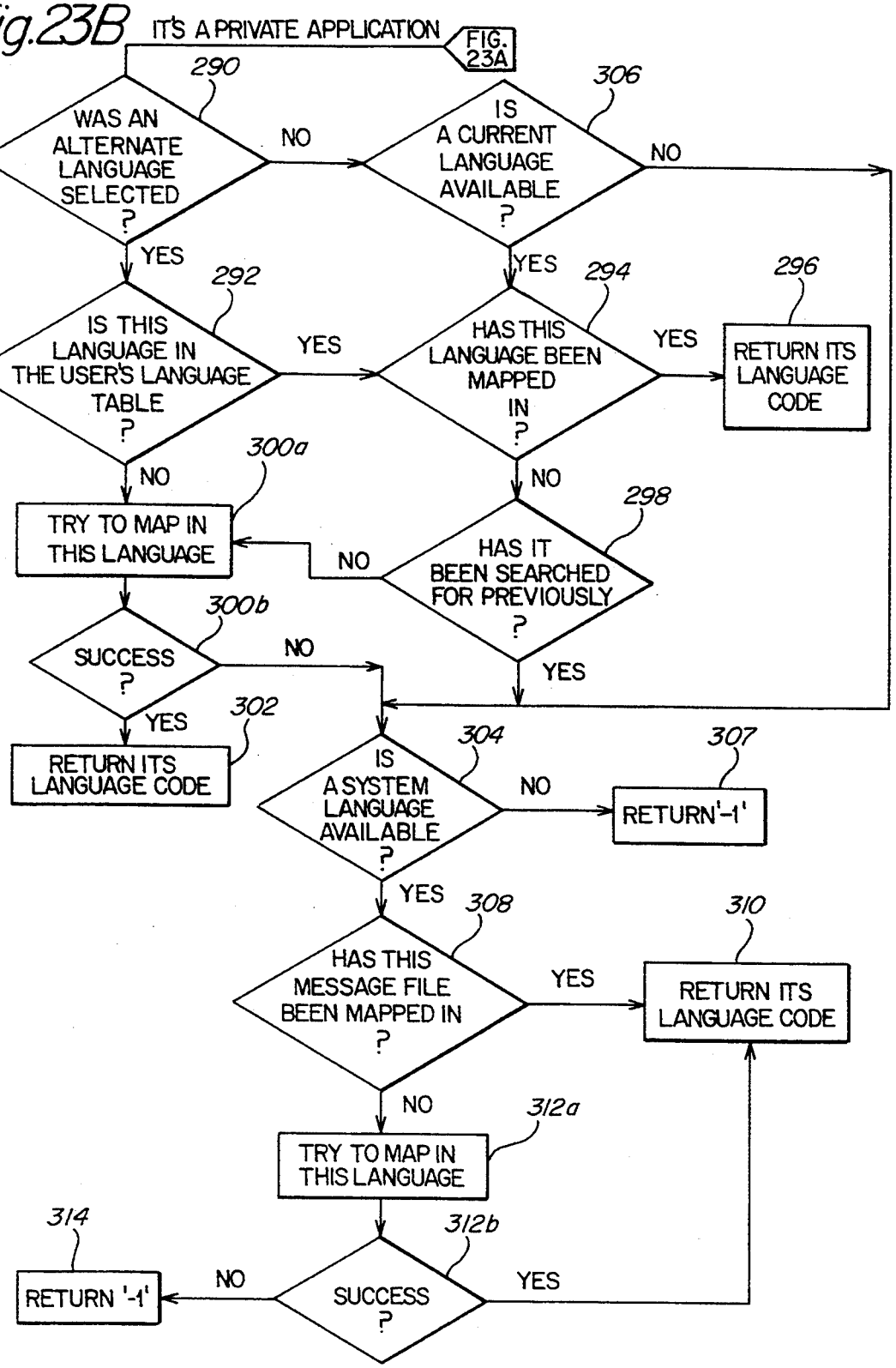

DATA PROCESSING SYSTEM PROVIDING USER INTERACTION IN MULTIPLE NATURAL LANGUAGES

FIELD OF THE INVENTION

The present invention relates generally to data processing systems and more particularly to data processing systems which may communicate with users in multiple natural languages.

BACKGROUND OF THE INVENTION

Most data processing and computer systems provide interaction with a user in only one natural language, such as English, French or German. Such natural languages are those used in speech by individuals and are distinct from computer programming languages. Due to the international context in which computers increasingly are being used, a need has arisen for data processing systems which interact with users in any of multiple natural languages, or "interaction languages".

In most data processing systems, interaction with a user involves sending and receiving messages between the user and the data processing system. To facilitate such message sending and receiving, a data processing system normally has standard instructions for sending output messages to the user and also has similar instructions for interpreting input messages received from the user. An application programmer uses these instructions in an application program in order to provide interaction between a user and the data processing system when the program is run, i.e., when the system is configured by the program and processes described by the program are executed by the configured system.

A well-known technique for sending and receiving messages involves placing output and input messages for an application program in a file or in a location separate from the application program. Such messages are referenced by the application program via codes or indices. This technique is known as "externalizing". The application program occasionally retains messages, i.e., which are not externalized, for use as default messages, for example. These messages are sometimes referred to as "hard-coded."

When an application program and corresponding externalized message file are employed in a system, a link is created, at run time, between the application program and the message file. This link specifies that the message file is to be used in conjunction with the application program to provide output and input messages for the program. In current systems, either a user or the application programmer has to explicitly specify the message file which is to be used with the application program. Hence, the link is not transparent to the programmer, and the application programmer as well as the user must know the names of available message files. In a system which supports multiple interaction languages, multiple message files are needed, thus complicating the burden on the programmer and the user.

A current multi-lingual system which adapts an "externalizing" approach, is the Native Language System (NLS). NLS is a system interface developed by X/OPEN which is a joint initiative by members of the business community to integrate evolving standards into a common, beneficial and continuing strategy. The system interface is a set of commands available for use in application programs to configure and manipulate a data processing system. Many implementations for supporting the NLS interface exist, but each implementation shares the functionality defined by X/OPEN in its *Portability Guide*, (1989), (note especially volume 2).

In NLS, each externalized message file for an application program containing output and input messages in an interaction language is identified by a string name known as a "catalog descriptor". With NLS an application programmer needs to know the catalog descriptor for a message file in order to load the message file into memory, and to retrieve messages from it. The catalog descriptor may be constructed from a default value, such as a system-wide default or a per-user default. In NLS, the user default value overrides the system default and may be used to override the default for an application program. No nesting capability is provided. If a message file in a desired language is not available for an application program, the user normally receives hard-coded messages of the application program. Because the application programmer uses the name of the message file in the application program, and also handles the opening and closing of message files, problems arise in the development of application programs.

A first problem with the NLS system is the required involvement of the application programmer in the management of message files. Periodically, message files for an application program are modified, or new message files are added for use by the application program. Such modifications and additions may require changes to application programs that reference the modified or additional message files. As a result, when such message files are provided to a customer, the application program must be updated as well, hence increasing both manufacturing costs to the application program supplier and material costs to the customer.

A second difficulty of the NLS system is that it requires an application programmer to develop a program for handling instances where a message file is not found during attempts to open the file or to retrieve a message from the file. Typically, such a program provides a hard-coded default message for use when a message or message file is not found. However, such default messages are provided solely at the discretion of the application programmer. As such, application programs produced by different application programmers may not have uniform default mechanisms. Thus, such application programs are not consistent in this respect.

Multi-lingual interaction in NLS is also not transparent to the user. For example, the user may be asked to select an interaction language. However, this capability is provided only at the discretion of the application programmer, and thus may not be consistent. This lack of a consistent mechanism for selecting an interaction language may be confusing both to the user and to the application programmer. Furthermore, a user often has to specify a desired interaction language more than once when using layered processes. Such inconsistent systems are inconvenient and annoying to use and maintain.

Finally, due in part to the lack of transparency and consistency, these systems fail to make use of the "nesting" capability of a system. That is, when an application program runs another application program (i.e., it makes a "nested" call), interaction language information is not "nested". A user also is not able to specify different languages for different program levels.

Application libraries are commonly used in large multi-user systems and contain common subroutines accessed by a number of application programs. Access to these application libraries often involves a kind of nested call. Without the provision of multi-lingual support for nested application programs or libraries, message handling for application libraries may be inconsistent or even unpredictable.

Accordingly, it is an object of the present invention to provide a data processing system and method capable of supporting user interaction in any of multiple natural languages in a manner that is transparent both to the user and to the application programmer.

It is another object of the present invention to provide a data processing system wherein the management of message files is transparent to the application programmer.

It is another object of the present invention to provide a data processing system that links a message file to an application program or library without user interaction.

It is still another object of the present invention to provide a data processing system which may support nested calls in different interaction languages.

SUMMARY OF THE INVENTION

To accomplish the foregoing and other objects, features and advantages of the present invention there is provided a data processing system which runs application programs and provides interaction with a user in multiple natural languages. A user may interact with one program in one language and another program in another language. Other users may interact with the same programs in yet different languages. Each application program has at least one corresponding message file which contains messages in a natural language. The data processing system stores application programs and corresponding message files and executes the processes of the stored application programs. An application program may retrieve messages from one of its corresponding message files in a selected natural language. In order to retrieve the message, the data processing system stores links in a link table, in which each link for an application program or library provides the location of a corresponding message file which contains messages in a given natural language for the application program or library. Multiple natural languages for a given application program or library may be maintained, preferably by the operating system, in the data processing system concurrently. A link in the link table is preferably established by the operating system during its process of loading a message file for an application program into memory. The link table is searched to locate the message file for a selected natural language, and subsequently the desired message is found within the message file indicated by the link. The selected natural language is chosen from at least a currently-used interaction language for a given application program and a default language. The system stores preferably both the current interaction language and the default language. The default language is normally initialized when a user begins to use the data processing system. The current interaction language is set when an application program is invoked.

In retrieving messages an interaction language is selected from at least one of the current interaction language and the default interaction language. A message is then retrieved using the selected interaction language.

When the data processing system is instructed to execute an application program, the current interaction language is initialized in a manner transparent to the application program and the user. The current interaction language is normally set to the default language; however, a desired interaction language may be specified when the program is invoked. When an interaction language is specified, the current interaction language is set to the desired interaction language if it is available.

The system further preferably stores nested language information for use in connection with nested application programs or layered processes. When an application program invokes another application program or library, the current interaction language is stored as the nested language information. This nested language information is preferably a stack or linked list. The current interaction language is then set to one of at least an indicated desired interaction language, the previous current interaction language or a default language. When a nested application program is terminated, the previous application program is restored and for the previous application program the current interaction language is reset to the previous interaction language. The previous interaction language and the nested language information for the restored application may then be removed from the means for storing nested language information.

By using either default languages or nested language capability, application libraries may be provided with multi-lingual input and output capability. Subroutine calls to an application library may be handled in a manner similar to nested application programs.

In the preferred embodiment of the present invention, the operating system handles multi-lingual interaction. An application program instructs the operating system to load message files and to retrieve messages therefrom. The performance of these processes by the operating system makes error handling, language nesting, and default mechanisms transparent and consistent.

BRIEF DESCRIPTION OF THE DRAWING

The operation and advantages of the present invention will be more fully understood from the detailed description below, which should be read in conjunction with the accompanying drawing, in which:

FIG. 5 is a diagram of a data structure of a link table for storing links between output message files and application programs and libraries;

FIG. 7 is a diagram of a data structure of a system language table for storing language names and corresponding language codes;

FIG. 8 is a diagram of a data structure of a system enablement table for storing information about the enablement of the interaction capabilities;

FIG. 19 is a flowchart describing how the data processing system may be configured and privately-enabled for interaction in multiple languages for only private application programs;

FIG. 20 is a flowchart describing how multi-lingual interaction may be initialized for a user upon a first use of the data processing system thereby;

FIGS. 23A-B are a flowchart showing the steps for finding a message file for an application program and loading the message file into memory;

DETAILED DESCRIPTION

Figure 1:
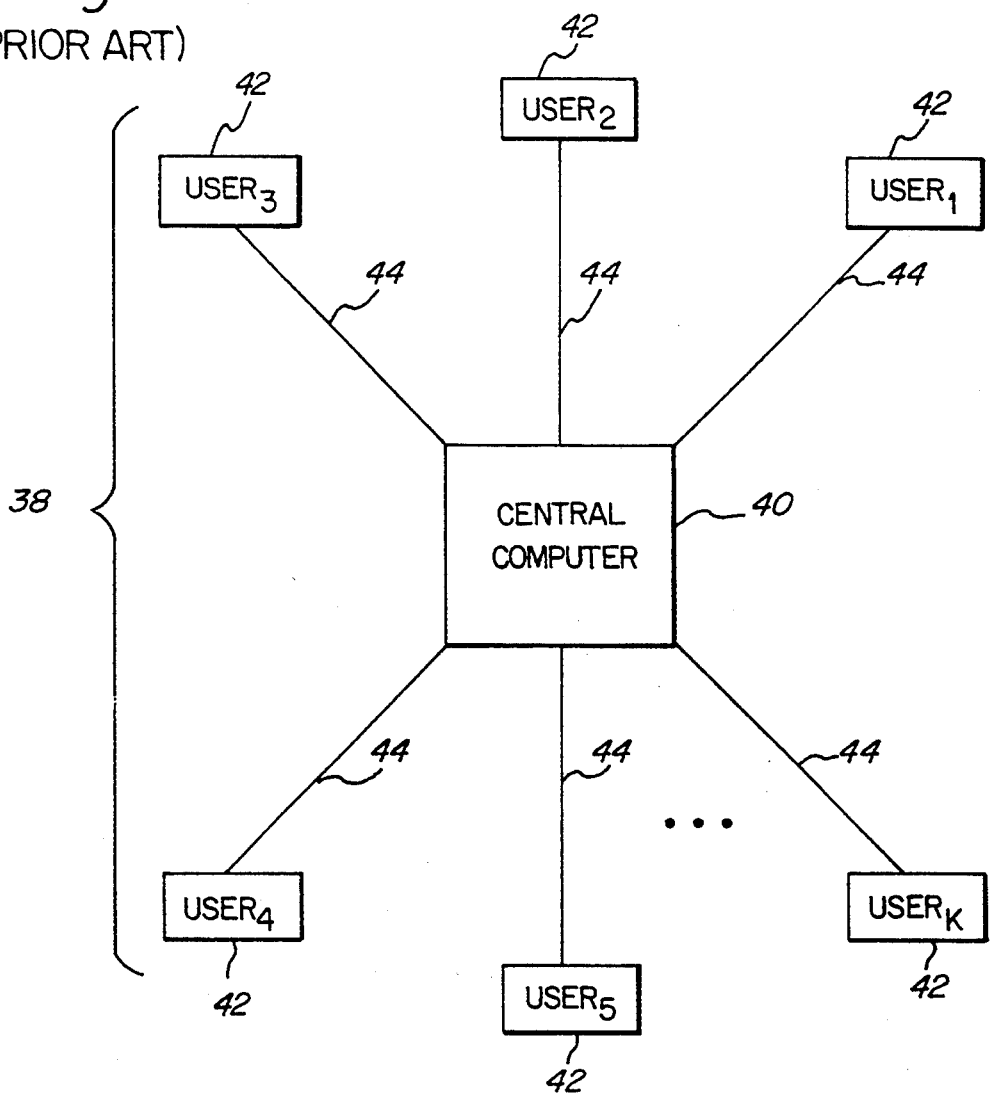
FIG. 1 is a block diagram of a data processing system of the type for practicing the present invention.
Figure 2:
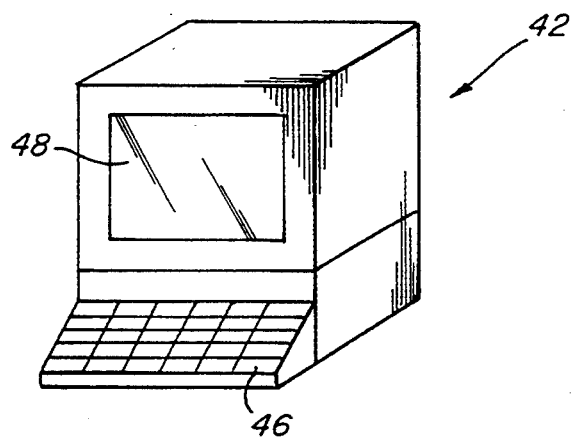
FIG. 2 is an isometric view of a typical user station for the data processing system of FIG. 1.

FIGS. 1-4 illustrate the structure of a data processing system 38 for practicing the present invention. The system 38 includes at least one central computer 40 interconnected with at least one user station 42 by a communication link 44 such as a cable or communication bus. Additional central computers 40 and user stations 42 may be interconnected to the system in a similar fashion. FIG. 1 show K user stations 42 connected to the central computer. Each user station is designated as $USER_n$ where n=1 ... K. Each user station 42 permits a user to interact with the central computer 40; thus, multiple user stations 42 enable more than one user to use the system simultaneously. More than one user may also use only one user station. The user station 42 (FIG. 2) may include a keyboard 46, a computer screen 48 or other device which enables the user to receive and transmit messages in a natural language.

Figure 3:
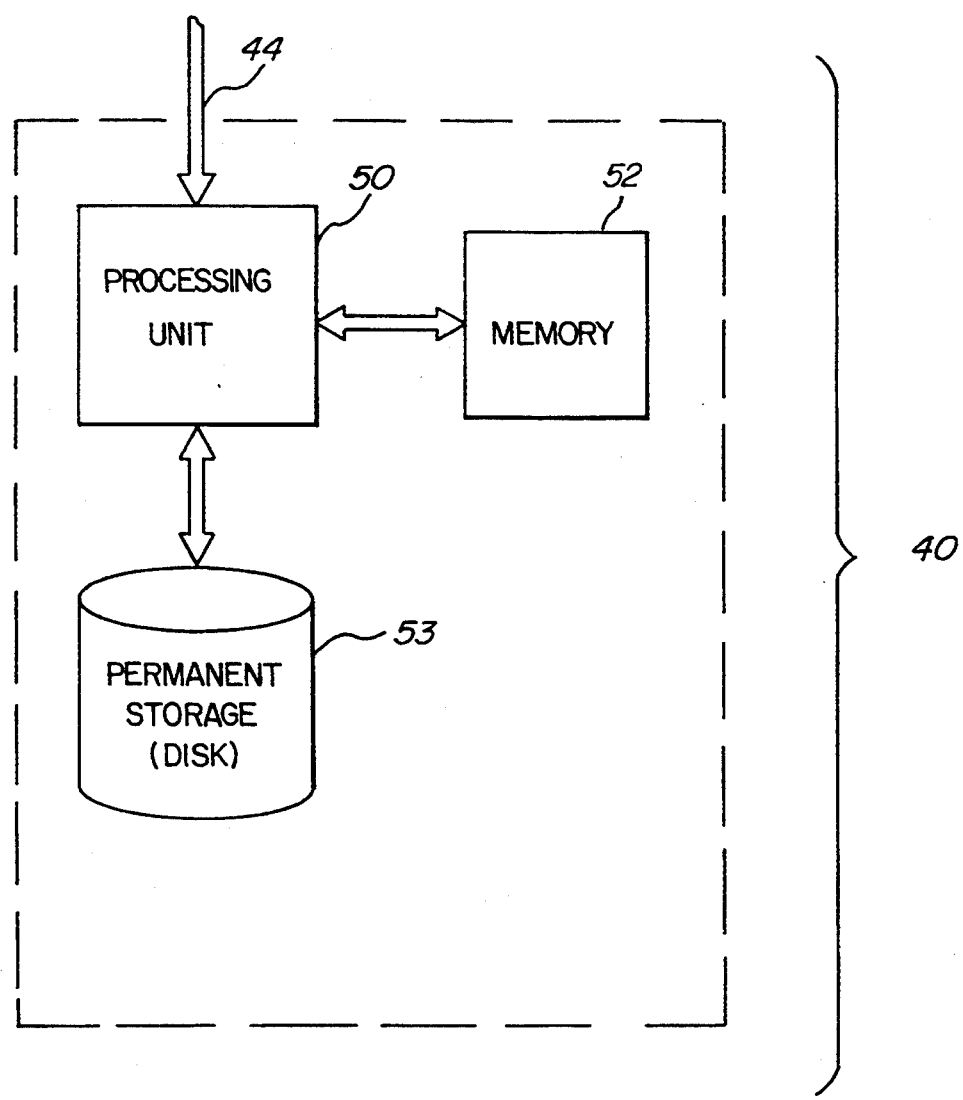
FIG. 3 is a block diagram of the structure of the central computer of FIG. 1.

As shown in FIG. 3, the central computer 40 may include a processing unit 50, a memory 52, such as a random access memory, and a permanent storage device 53 such as a disk storage mechanism. The processing unit 50 has read and write access to both the memory 52 and the permanent storage device 53. The memory 52 may hold a copy of an application program to be executed by the processing unit 50. The memory 52 further may hold a message file for the application program. The processing unit 50 is connected to the respective user stations 42 through the communication links 44.

Figure 4:
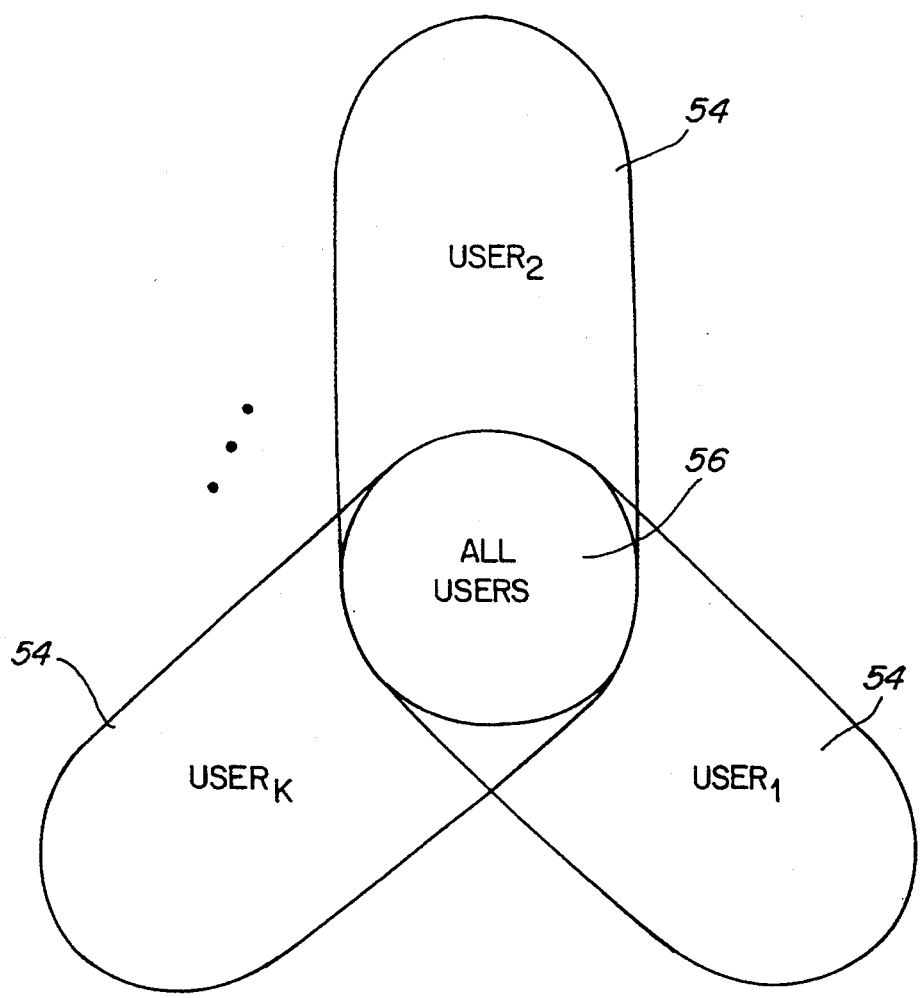
FIG. 4 is a diagrammatic illustration of the division of the memory of FIG. 3 into private and shared portions.

The memory 52 is preferably logically divided into portions, as diagrammatically illustrated in FIG. 4, such that a user has exclusive read and write access to a private portion 54 of the memory (hereinafter called private memory 54), as well as read access to a shared portion 56 which the user shares with other users (hereinafter called shared memory 56). The shared memory 56 holds application programs and message files which may be shared by many users. The private memory 54 may hold privately owned application programs and message files. FIG. 4 shows three private memory portions 54 (labelled $USER_1$, $USER_2$ and $USER_K$) and the shared memory 56 (labelled "ALL USERS"). $USER_1$ may have read and write access only to the private memory 54 corresponding to $USER_1$ and read access to the shared memory 56. Likewise $USER_K$ may have read and write access only to the corresponding private memory 54 for $USER_K$ and read access to the shared memory 56. Write access to the shared memory is provided in special circumstances, such as to a system administrator.

A suitable data processing system 38 is the Prime 50 series computer sold by Prime Computer of Natick, Mass. For illustrative purposes, the discussion that follows will focus on an implementation using this system. Such a Prime 50 series data processing system maybe configured using the programming language 'SPL' (which is similar to PL/I) to implement the data structures and processes described below. The memory structure is preferably a ring-based architecture, but other standard memory structures may also be suitable. It should be understood that the description above in connection with FIGS. 1 through 4 is merely illustrative. Other multi-user computer systems allowing shared and private memory are also suitable for practicing the present invention. Based on these teachings, those skilled in the art will know how to modify the data structures and flowcharts described herein to conform with different architectures or different systems.

In order to have multi-lingual interaction with application programs running on a system as described above, an application program has at least one corresponding message file. A message file contains output and input messages for an application program in a natural language. Message files that provide messages in different natural languages are preferably kept separate. Message files should be named in a manner which, from the application program and language, the name of a message file may be readily determined. A suitable format is "<application name>.<language>.msg". Those skilled in the art will know of other suitable formats. The selected format will depend often on the computer on which the system is implemented.

A suitable message file is shown in Table I, named "example.english.msg" and containing two messages.: max_users_exceeded 'System not admitting users at this time' unable_to_at_to_or 'Unable to attach to your initial directory'

TABLE I

Such a message file may be developed from a message source file which includes the messages for all languages. This source file may be compiled to produce separate message files. A source file helps to insure the accuracy of translations of a message by placing them together in a file, in a manner that an editor may view them simultaneously. Such a source file is shown in Table II.

When the message source file is compiled, a mapping of mnemonics (such as "max_users_exceeded") to numbers may also be performed to save memory space. Also, the language names used in the message source file and the message file name may be other indications of the language name other than the proper name, e.g. English. These other indications may include abbreviated codes, such as the ISO standard 639, or country codes.

LANGUAGES 0'English' 1'francais' 2'Deutsch' max_users_exceeded 0'System not admitting users at this time' 1'Nombre maximum d'usagers depasse.' 2'Maximale Benutzer-Anzahl wird ueberschritten.' unable_to_ at_or 0'Unable to attach to your initial directory.' 1'Incapable de vous relier a votre boite initiale.' 2'Das Aufpruefen auf die Zugangs ist nicht moeglich.'

TABLE II

When an application program (or library) is loaded into memory, a message file for the program also needs to be loaded into memory. In order to tie together the application program, the message file and the user so as to enable the application program to retrieve messages from the message file, a link is established between the application program and its message file. A link table 60 (FIG. 5) for a user stores links for programs loaded by the user.

A link table 60 is provided in the private memory 54 (hereinafter called the private link table 60) for each user for private application programs. The shared memory 56 (FIG. 3) also includes a link table 60, but this link table is used for shared application programs (hereinafter called the shared link table 60).

An additional link table 60 for the operating system, which is distinct from the shared link table, may also be provided. For illustrative purposes, the description of the operation of the system that follows assumes that a separate link table is provided for the operating system. Nevertheless, it should be appreciated that this description is merely illustrative, and those skilled in the art will know of other equally viable alternatives.

A link 65 in a link table 60 includes an indication of the application program, the language for a message file, and the location of the message file in memory. A preferable form of a link includes program field 62, language field 68 and a pointer field 66. A program field 62 identifies an application program using the name of the application program or, alternatively, the range of the location of its procedure code in memory. Language field 68 indicates the natural languages in which the messages of the loaded message file are written. A language field 68 may store the name of the language, a number, or, alternatively, a mnemonic code, and has a size which depends on the implementation. Pointer field 66 contains a pointer to the location in memory at which the message file is loaded.

A link is established in a link table 60 when a message file for an application program is loaded into shared or private memory 54. The language indicated by an established link is "installed" for that application program. The installation of languages and other operations of the system will be described below in more detail.

Figure 6:
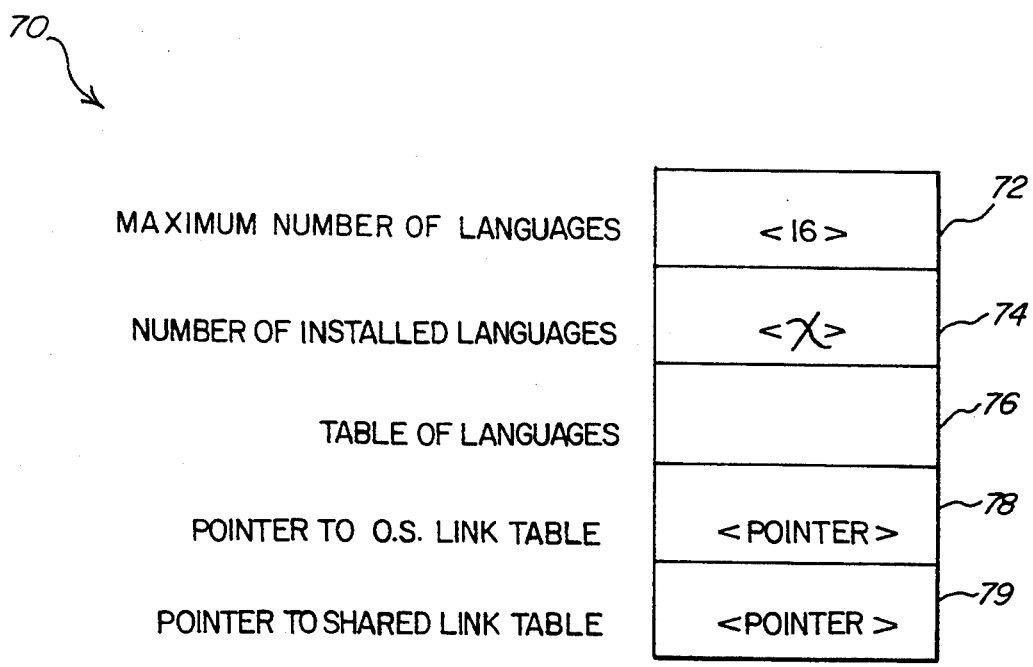
FIG. 6 is a diagram of a data structure of a system information table for storing information about the current status of the interaction capabilities.

FIGS. 6–8 are diagrams of data structures which are provided in the shared memory 56 of the data processing system 38. These structures provide the basic support for operation of the system for multi-lingual interaction for shared applications. These structures include a system information table 70 (FIG. 6), a system language table 76 (FIG. 7), and a system enablement table 90 (FIG. 8). The system information table 70 (FIG. 6) holds information regarding the status of multi-lingual interaction capabilities. The system language table 76 (FIG. 7) is used for matching language names with language codes. The system enablement table 90 (FIG. 8) holds information regarding the status of the enablement of the system.

The system information table 70 (FIG. 6) will now be described in further detail. The system information table 70 includes a field 72 which indicates the maximum number of languages which may be installed in the system. The table 70 also includes an installed languages field 74 which indicates the number of natural languages which are currently installed on the system. Both fields 72 and 74 have a size of one byte. The value of the installed language field 74 is limited by the value of the maximum languages field 72. A system language table 76, to be described later in connection with FIG. 7, may also be included in the system information table 70.

The system information table 70 further includes a pointer field 78 that is used to indicate the location of the operating system link table 60 in memory 52. A pointer field 79 is also provided in table 70 to indicate the location of the shared link table 60 (FIG. 5) in memory 52 (FIG. 3). Although it is possible for both of the pointer fields 78 and 79 to be replaced by the actual link tables 60 to which they point, it is preferable to separate the link tables 60 from the system information table 70 for two reasons. This separation allows the link table 60 to be dynamically allocated while allowing the system information table 70 to be statically allocated. Since the system information table 70 has a fixed size, dynamic allocation is not required for this table. Second, by having separate link tables for the operating system and shared programs, the system restricts access to the operating system link table 60 and, thus, provides greater insurance of the integrity of the operating system.

The system language table 76, illustrated in FIG. 7, has entries 80, which include a language code 82 and corresponding language name 84. An example of a language name 84 is, "English". Preferably, the language code 82 is a numerical code but other codes, such as mnemonic codes like "ENG", or numbers, may also be used. The language code field 82 is preferably one byte. Entries in this table 76 may be accessed by either the language code entry 82 or the language name entry 84. The language name field 84 is made of ten dynamically allocated characters.

For the system language table 76, enough memory is allocated to store the maximum number of entries 80 equal to that specified in the maximum number of languages field 72. Hence, the system information table 70 has a fixed, pre-determined size. Field 72 is set during initialization of the system to a predetermined value, e.g., '16'.

The system enablement table 90 (FIG. 8) is provided to indicate the status of the enablement of the interaction capability of the system, as mentioned above. The status of interaction may be either "privately-enabled" or "fully-enabled". The system is privately-enabled when the system is capable of interacting with a user in multiple natural languages through an application program or library loaded into private memory 54. The system is fully-enabled when the system is capable of interacting with a user in multiple natural languages through shared and private application programs and through the operating system.

The contents of table 90 differ in the different enablement states as shown in columns 91 and 93, respectively, in FIG. 8. Field 92 is used to indicate whether the system is at least privately-enabled. That is, field 92 contains a false value, e.g, '0', when the system is not enabled for private use. Field 92 may be realized by a single bit which is switched between a logical 0 and a logical 1. The use of this field 92 enables multi-lingual interaction with private application programs (i.e., the system may be privately enabled) without enabling interaction with the operating system and shared applications (i.e., when the system is not fully-enabled). This capability is particularly useful in areas where the operating system and/or shared applications are provided with only one (or none) interaction language message file but where users have private application programs with multiple message files.

A system default language field 94, having a size of one byte, is also provided in the system enablement table 90 to indicate the default natural language for the operating system to interact with a user. Also, if a user is using a private or shared application program for which the user default language is not available, the system attempts to use this default language. Finally, a pointer field 96 is provided to indicate the location of the system information table 70 in the memory 52.

The structures of FIGS. 6–8, found in shared memory 56 (FIG. 4), provide a basic structure for multi-lingual interaction with the operating system and shared application programs. Such interaction is preferably provided in a manner that may be easily enabled and disabled. For this purpose, preferably only the system enablement table 90 of FIG. 8 is maintained as a permanent structure of the system. Thus, other information and structures need not be allocated when multi-lingual interaction is not fully-enabled.

Referring now to FIGS. 9–13, the data structures assigned on a per-user basis in a preferred embodiment of the present invention will now be described. The following data structures are provided in the private memory 54 for the user, along with a private link table 60: a user default language field 100 (FIG. 9) similar to the system default language field 94 (FIG. 8), a user language table 110 (FIGS. 11–12) similar to system language table 76; a user information table 130 (FIG. 13) similar to system information table 70, and a nested language stack 102 (FIG. 10) for storing nested language information.

Figure 21:
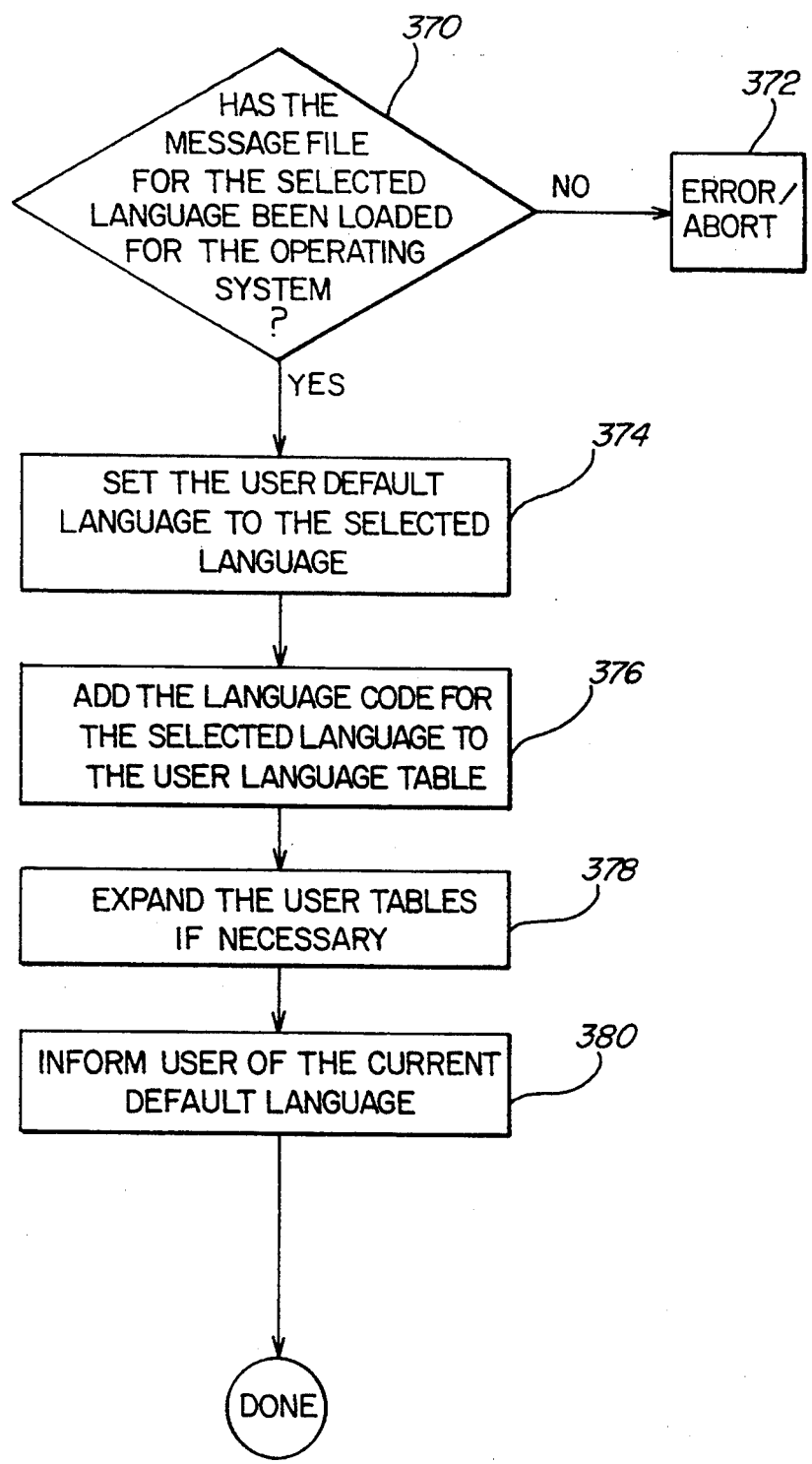
FIG. 21 is a flowchart describing how the user default language may be changed.
Figure 22:
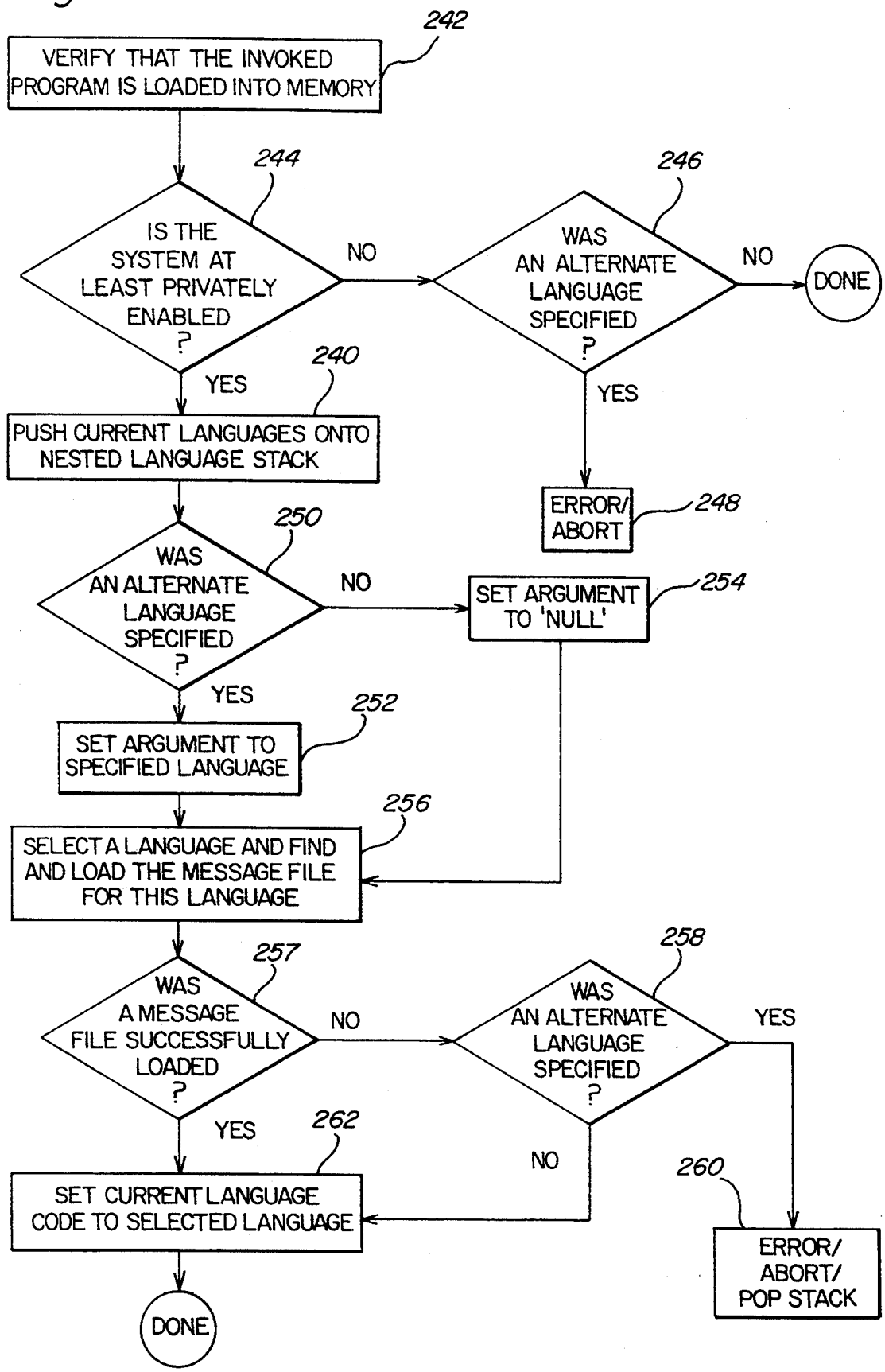
FIG. 22 is a flowchart describing how an application may be invoked for multi-lingual use.

The user default language field 100 (FIG. 9) is provided for storing the preferred interaction language for a user and has a size of one byte. When this structure 100 is allocated for a user it takes on the value of the system default language field 94 (FIG. 8) unless explicitly changed by the user. The user is capable of changing this default language by executing a command from the user station. This command is preferably in the form of the name of the desired language, such as "francais." The steps of this command are described in fuller detail later in connection with FIG. 21. When the system is enabled for multi-lingual interaction, field 100 indicates a language by a language name, a language code or other type of indicator (Column 101). Otherwise it contains a non-language value, e.g., '−1' (Column 99). The user language field 100 is preferably located in memory 52 which is not re-initialized if a user's process is re-initialized. In a ring-based architecture, a ring may satisfy this condition. This field 100 is analogous to field 94 for the system and shared applications. It indicates a default language to be used when no other language is specified or available for the operating system or application programs or libraries. If this language is not available, the system default language may be used.

A nested language stack 102 (FIG. 10), is also provided for a user. It may be used in conjunction with a standard mechanism for nesting application programs. This nested language stack 102 is constructed as a stack or similar structure, such as a linked list or an array. An entry 104 in the nested language stack 102 comprises a field 106 indicating the language in which a previously running shared application program interacted with the user, and a field 108 indicating the language in which a previously running private application program interacted with the user. In an entry 24, one of these fields indicates a language and the other holds a non-language value. Each field has a preferable size of one byte.

A user language table 110 (FIG. 11), is also provided for a user for storing information about available or installed private interaction languages. The installed languages field 112 is provided to indicate the number of languages which are installed and has a size of preferably one byte. Since an installed language is given a code, preferably a number, the number of installed languages may be used to generate the code for a newly installed language.

It may occur that a user's code for a private language is different from the system language code for that language as found in the system language table 76. Therefore, a user language correspondence table 114 is provided to indicate the correspondence among a user's specific language codes and language names with the system-wide language codes. The structure of the user language correspondence table 114 is illustrated in more detail in FIG. 12. In the table 114, an entry 116 may be indexed using a user's language code, as shown at 118, or a field 120, having a size of about ten characters, indicating the corresponding language name, and a field 122 indicating the language code used by the operating system, as established through the system language table 76 (FIG. 7). Fields 118 and 122 may have a size of about one byte. This table 114 is used because the language code used by one user to represent a language may differ from the code used by the rest of the system.

Figure 10:
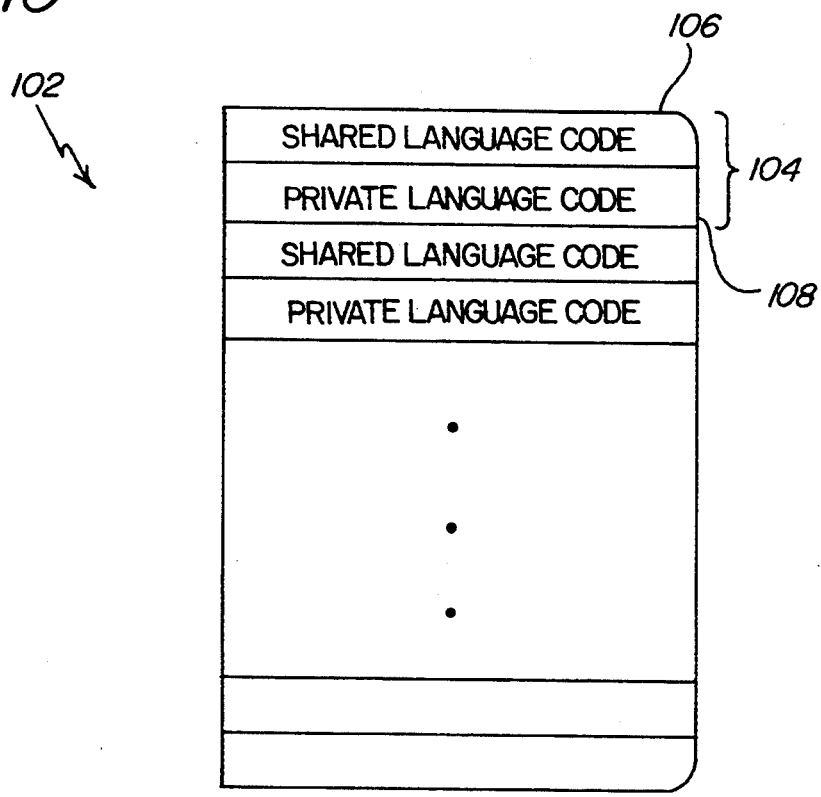
FIG. 10 is a diagram of a data structure of a user nested language stack for storing interaction language information for nested programs.
Figure 11:
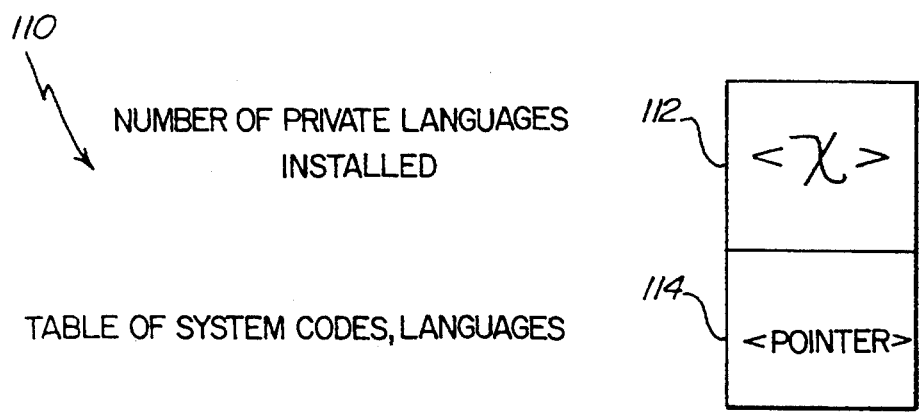
FIG. 11 is a diagram of a data structure of a user language table for storing information about the interaction languages used by a specific user.

The user information table 130 (FIG. 13) is analogous to the system information table 70. This table is used to tie together the user-specific information and to provide links to the system-wide information. This table contains four pointer fields 132, 142, 144 and 146. Representative values for an enabled system an a non-enabled system are shown, respectively, in columns 131 and 133. Pointer field 132 indicates the location of the user nested language stack 102 (FIG. 10). Pointer field 142 indicates the location in private memory 54 of the private link table 60 (FIG. 5) which is provided for a user in the private memory 54. Pointer field 144 indicates the location of the system information table 70 (FIG. 6) in shared memory 56 (FIG. 3). Finally, pointer field 146 indicates the location of the user language table 110 (FIG. 11). One or more of these pointer fields may be readily replaced by the structures to which they point. However, keeping these structures separate conserves memory space when the multi-lingual interaction of the system is not enabled. Also, if the user information table 130 contained the structures of variable size, it would no longer have a fixed size which, though possible, is not preferred.

The remaining fields of the user information table 130 (FIG. 13) include a field 134 which indicates the interaction language for the currently running private application program, and a corresponding field 136 for shared applications programs. A field 138 indicates the current maximum number of private languages in which a user may interact with the system. This number may expand dynamically, preferably in increments of 4, as may be necessary. Finally, a field 140 is used to indicate the maximum amount of private memory 54 that a user may have. These fields each preferably have a size of about one byte.

The multi-lingual operation of a preferred embodiment of the invention will now be described in connection with FIGS. 14–33.

This operation may be described, generally, in the following manner. An application program may include input and output message commands which appear to be similar to such commands used in single-language systems. Thus, an application program may indicate just the desired message using a message number or a mnemonic. The operating system of a computer or a multi-lingual processor, receives this command and determines the message file from which it should retrieve the indicated message. The above preferred data structures and below preferred processes support this interaction making multi-lingual interaction transparent to the application programmer and user.

The configuration of a system, exemplified by FIGS. 1–4, for fully-enabled multi-lingual interaction with users will now be described in connection with the flowchart of FIG. 14. The configuration process includes initializing system variables or arguments, and loading message files for the operating system, including establishing links thereto. This configuration begins with searching (step 150) for available message files for the operating system. A counting variable, or argument, e.g., named 'X', is set to the number of languages found. If desired, the number 'X' could simply be set by a user in order to alleviate the searching in step 150. This option is desirable when the number of languages is known. The system is then configured for use with the number 'X' languages in step 152. The step 152 of configuring the system for use with 'X' languages is described in further detail in connection with FIG. 15. If the step 152 of configuring the system is not successful, as detected in step 154, an error is signaled (step 158). If the configuration of the system is successful, operation continues to step 156 wherein message files are loaded for the available languages. The process of loading a message file is described below in further detail in connection with FIG. 17.

Figure 15:
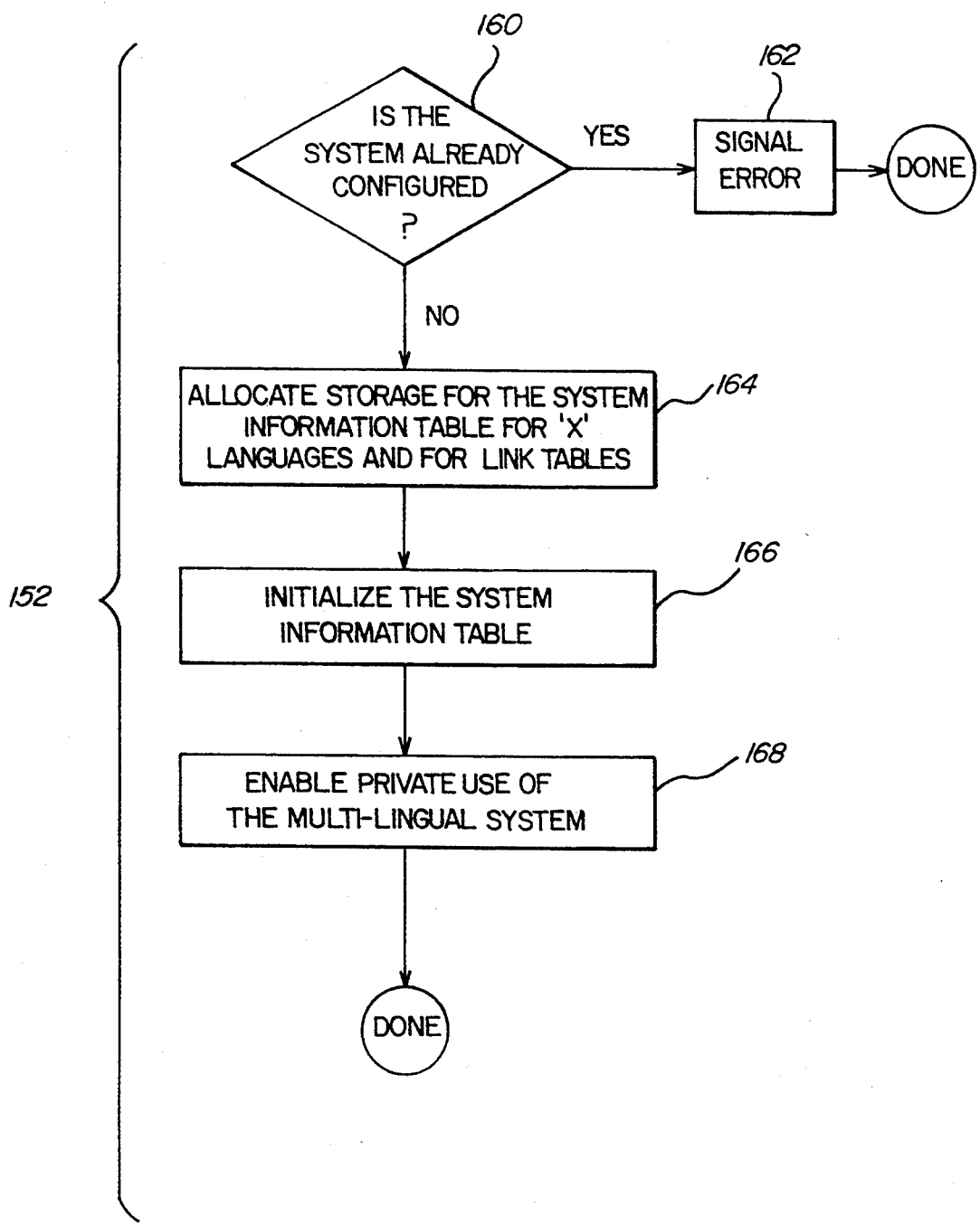
FIG. 15 is a flowchart describing how the data processing system of FIG. 1 may be configured to interact in a given number of languages.

The process of configuring the system for multi-lingual interaction with a number 'X' of natural languages is illustrated by the flowchart of FIG. 15. In this process, it is first determined, in step 160, whether the system has already been configured, or fully-enabled, preferably by examining the pointer field 96 (FIG. 8) which indicates whether the system information table 70 has been initialized. Since a configured system Should not be reconfigured while other users may be utilizing it, an error is signaled (step 162) if reconfiguration is attempted. Otherwise, the system is configured in step 164 by allocating storage for the system information table 70 (FIG. 6), as well as the link tables 60 (FIG. 5), for the operating system and for shared application programs.

The size of the system language table 76 (FIG. 7) for which allocation is performed (step 164) is determined by the number of languages indicated by the value 'X'. Through this step 164 of allocating, the pointer fields 78 and 79 of the system information table 70 (FIG. 6) are set. The pointer field 96 (FIG. 8) of the system enablement table 90 is also set in step 164. The remaining values of the system information table 70, i.e., installed languages field 74 and maximum number of languages field 72, are set in step 166 respectively to the number of languages installed and the maximum number of languages, e.g., the value of 'X'. Next, multi-lingual interaction for private application programs is enabled in step 168 by setting the field 92 of the system enablement table 90 to a "true" value (step 168). Upon completion of this configuration step, link tables 60 remain empty, and there are no language values in the language tables. Furthermore, message files have yet to be installed (field 72), and a default interaction language (field 94) has yet to be set.

Figure 16:
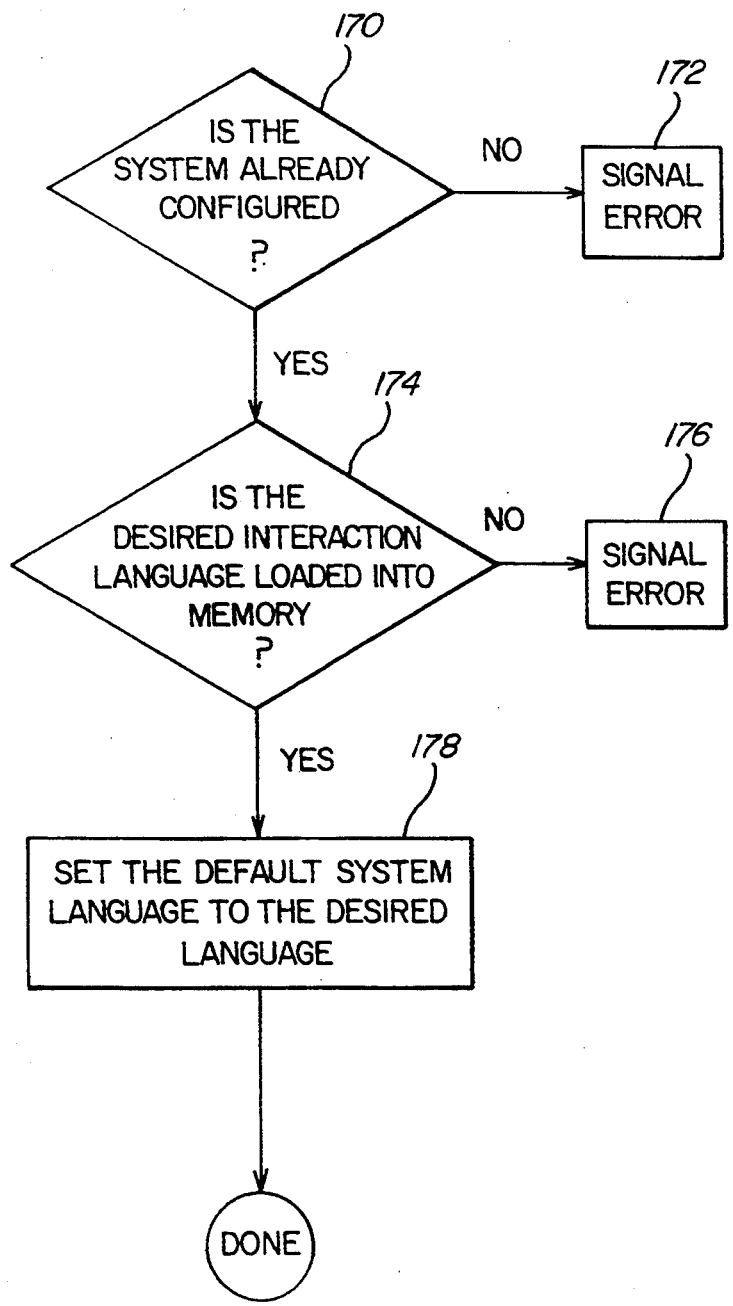
FIG. 16 is a flowchart describing how the operating system default language may be changed.

The default operating system interaction language (field 94) may be changed by a person with sufficient authorization in the system, such as a system administrator, by using a process as described in FIG. 16. The system administrator invokes this process indicating a desired new interaction language. Since the default system language should not be changed unless the system is configured, such configuration is verified (step 170, similar to step 160 of FIG. 15) and an error is signaled (step 172) if the system is not configured. If the system is configured, it is determined (step 174) whether the message file for the desired interaction language is loaded into memory. If the desired interaction language is not loaded into memory, an error is signaled (step 176) and the operation aborts. Otherwise, the default operating system interaction language field 94 (FIG. 8) is set (step 178) to indicate the desired language. This system default language is not the same as the user default language. The former may only be changed by the system administrator or the like; the latter by the user, though both may indicate the same language.

When the system has been configured, application programs may be loaded and executed and links are made between programs and message files.

Figure 17:
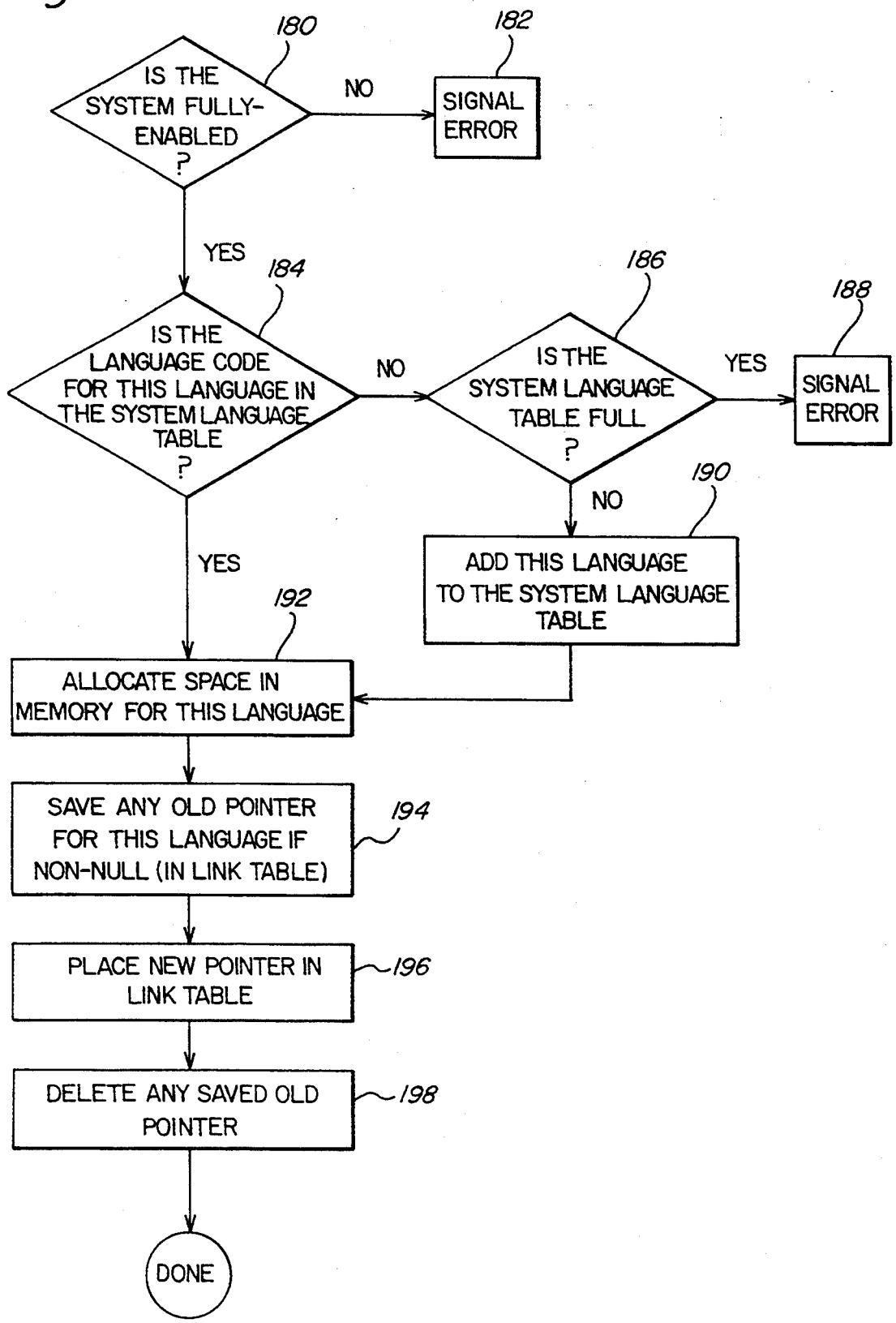
FIG. 17 is a flowchart describing how a message file for an interaction language for a shared application program may be loaded.

The process for loading a message file for an interaction language for a shared application will now be described in connection with FIG. 17. For this process, the desired interaction language for the application program has already been established. The first step of this process is the step 180 (similar to step 160) of determining whether the system is enabled for multi-lingual interaction. An error is signaled (step 182) and the operation aborted if the system is not fully-enabled. If it is determined in step 180 that the system has been configured for multi-lingual interaction, the language code for the desired interaction language is sought in the system language table 76 (FIG. 7) in step 184. If the code is not found, and if the table 76 is full, as determined in step 186, an error is signaled (step 188) indicating that the maximum number of languages has already been installed on the system.

If the language code is not found in step 184, but the system language table 76 is not full, an entry 80 is added to the system language table 76 (step 190) for this language code and its corresponding language name. After the language code for the requested interaction language message file has been found (step 184) in the system language table 76, or has been placed there in step 190, space is allocated in the shared memory 56 for this message file (step 192). After the step 192 of allocating memory space, the shared link table 60 (FIG. 5) is searched in order to determine if an old pointer to a message file for this interaction language exists. An old pointer, if found, is temporarily saved through step 194. Subsequent to the step 194 of saving an old pointer, the new pointer to this message file is stored in the link table 60 (step 196), which is followed by the step 198 of deallocating an old non-null pointer that had been previously saved in step 194.

Message files for a shared application program are normally not loaded unless the application is loaded into shared memory 56. The above described process assumes that a shared application program is loaded into memory 52 and that the message file for the desired interaction language exists. The existence of a shared message file is verified in step 150 (FIG. 14) for operating system message files, and step 206 (FIG. 18) to be described later for other shared applications.

A shared application, other than the operating system, is normally loaded by a person with sufficient authorization, such as a system administrator, by the issuance of a load command. The process of loading is outlined by the flowchart of FIG. 18. Loading a shared application in response to a load command begins with step 204 of loading the application into shared memory 56. Next, it is verified in step 205 that multi-lingual interaction with the system is fully-enabled by examining pointer field 96 of the system enablement table 90 (FIG. 8). If multi-lingual interaction is not fully-enabled, the loading operation is complete. Otherwise, the operation continues with the step 206 of determining the available message files for the shared application program. Each available message file is then loaded into the shared memory 56 (step 208), according to the process described above in connection with FIG. 17.

Figure 14:
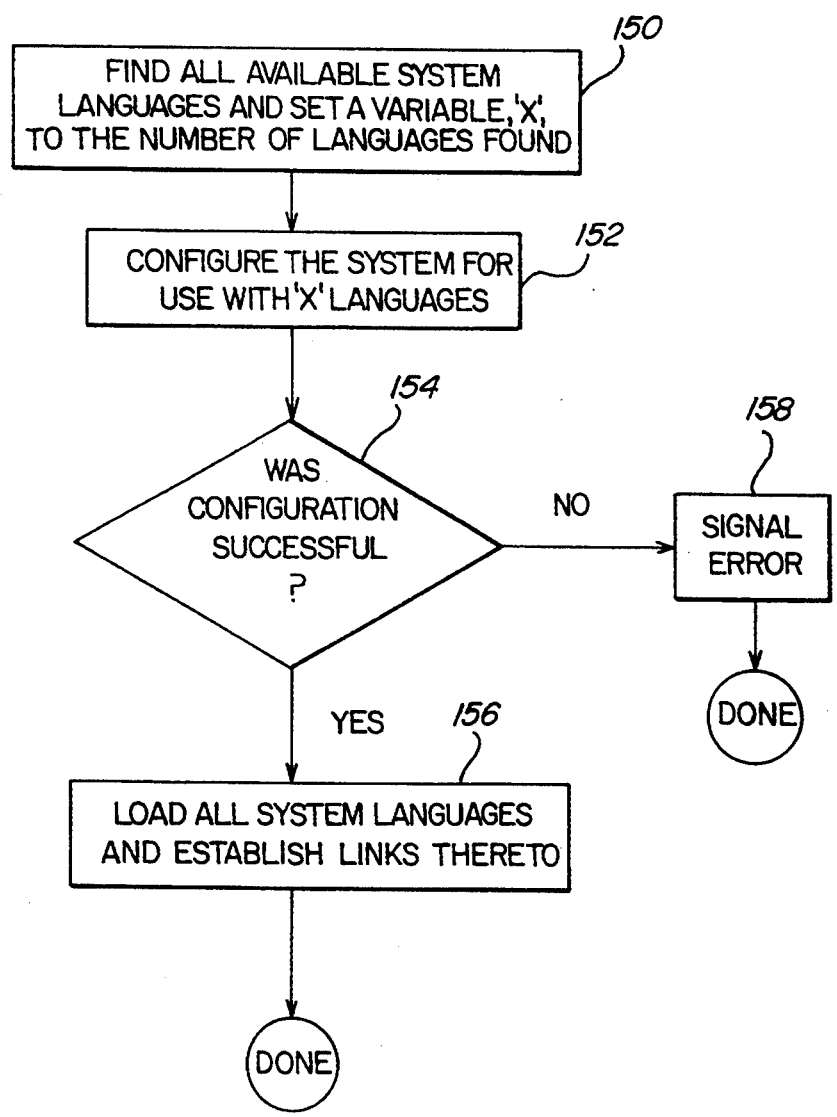
FIG. 14 is a flowchart describing how the data processing system of FIG. 1 may be configured to be fully-enabled to interact in multiple languages.
Figure 18:
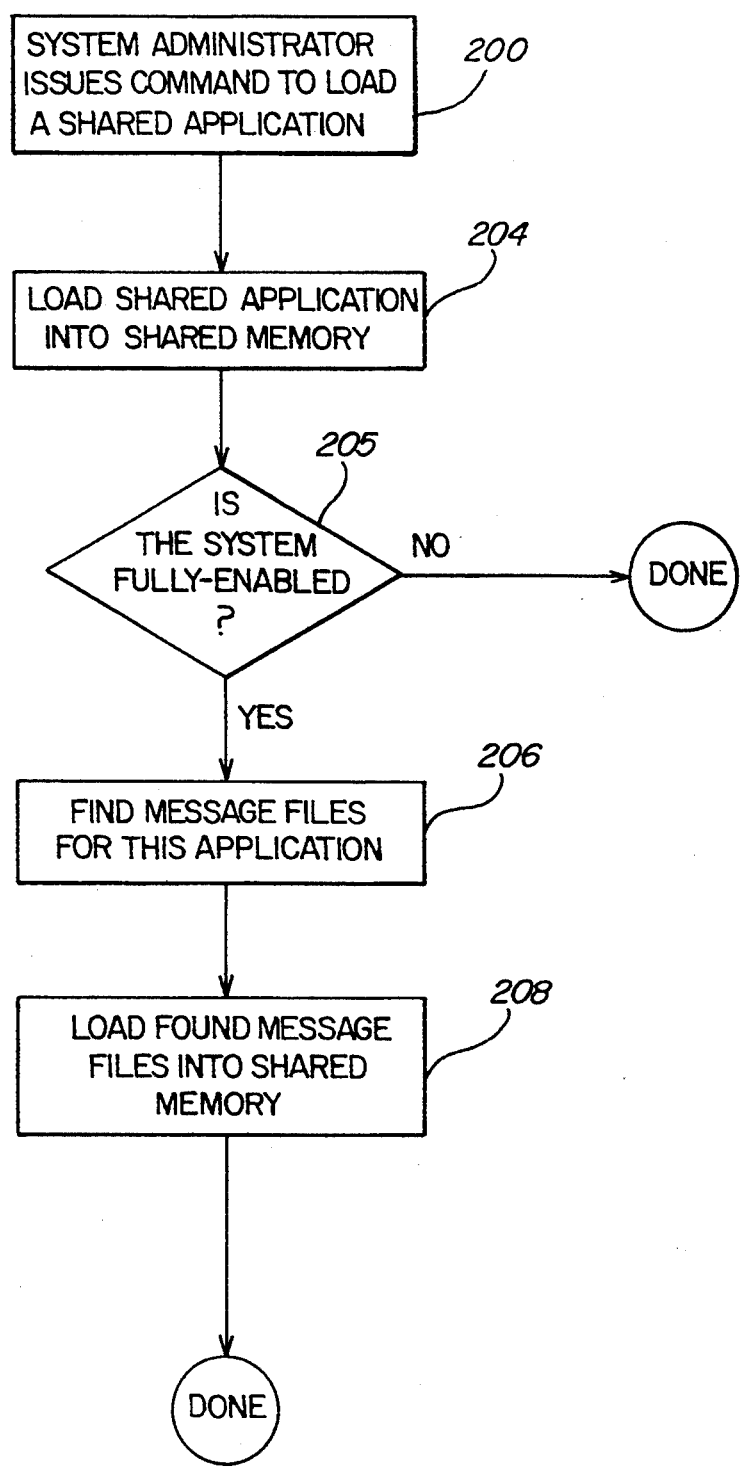
FIG. 18 is a flowchart describing how a shared application program may be loaded into memory.

When the processes of FIGS. 14 and 15 have been successfully completed, the system is fully-enabled for multi-lingual interaction with the operating system and any other shared application programs loaded via the process of FIG. 18. Enablement of multi-lingual-interaction with private application programs will now be described in connection with FIGS. 19 and 20.

In order to enable multi-lingual interaction for private application programs, step 210 (FIG. 19) of initializing the enablement field 92 (FIG. 8) is performed to set the field 92 to indicate that multi-lingual interaction is enabled for private application programs. This step 210 of initializing is the same as the step 168 performed as part of the system configuration (FIG. 15). Step 210 of initializing may also be performed in order to enable multi-lingual interaction with private application programs when the system is not configured for such interaction with the operating system and other shared application programs, thus making the system privately-enabled but not fully-enabled. In order for this enablement process to be performed, a user should have appropriate clearance to access enablement field 92, such as the clearance of a system administrator. This process is performed before other users interact with private application programs in multiple languages.

Figure 13:
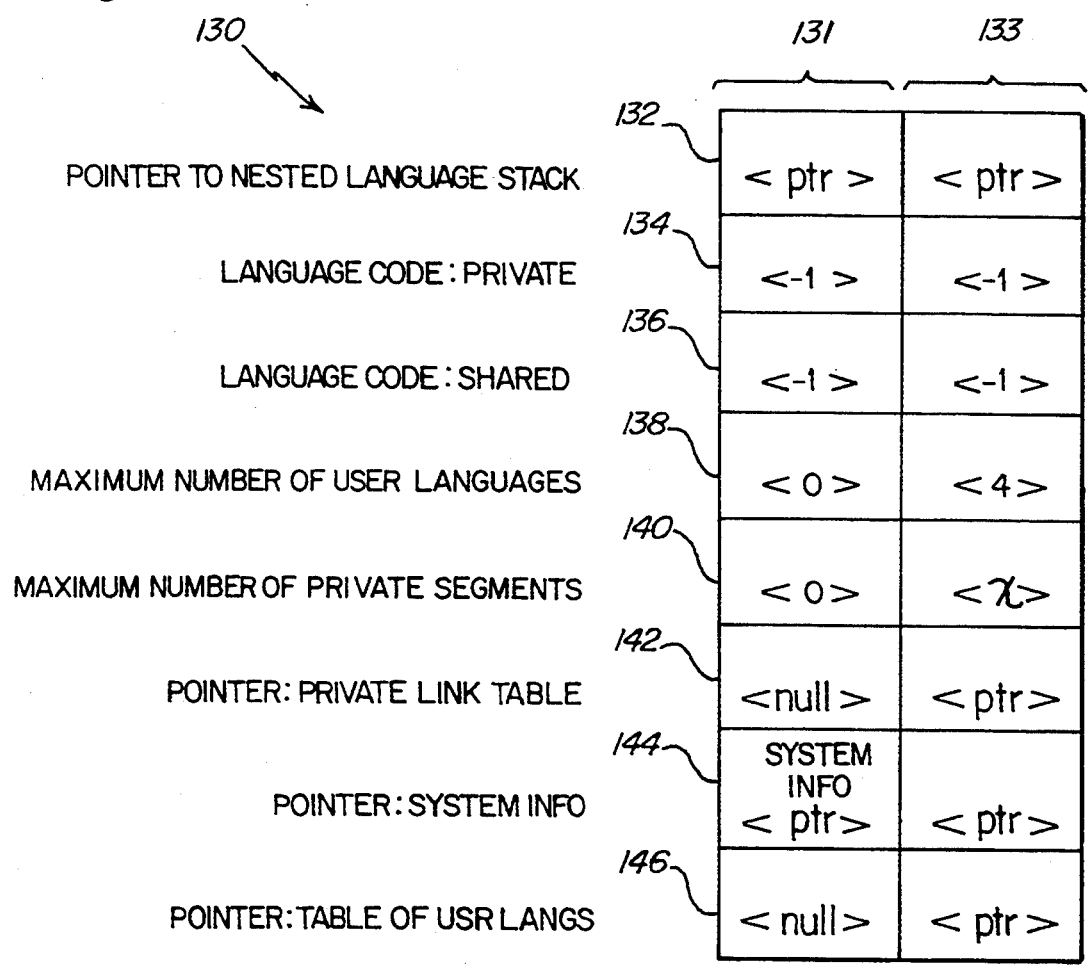
FIG. 13 is a diagram of a data structure of user information table for storing information about the current interaction capabilities for a user.

When a user begins to use the data processing system, normally by "logging into" the system from a user station, the per-user data structures, especially the user information table 110 (FIG. 11), are initialized via the process described by the flowchart of FIG. 20. Initialization begins with the step 220 of initializing the language code fields 134 and 136 and the pointer 144 to the system information table 70 (FIG. 6) of the user information table 130 (FIG. 13). The language codes of fields 134 and 136 are initialized to a non-language value, and the system information table pointer 144 is set to the location of the system information table 70 as obtained from the corresponding field 96 from the system enablement table 90 (FIG. 8). If the system is not at least privately-enabled for multi-lingual interaction (it may be fully-enabled as well), as determined in step 222, the remaining per-user fields are set to non-enabled default values. That is, the maximum number of user languages 138, the maximum amount of private memory 140, the pointer 142 to the private link table 60 and the pointer 146 to the user language 110, are set respectively to, e.g., '0', '0', 'null' and 'null' (step 224). In this manner, memory space is allocated neither for the private link table 60 nor for the user language table 110, thus saving memory space.

If multi-lingual interaction has been enabled for private application programs, as determined in step 222, memory is allocated for the user language table 110 and the private link table 60 (step 226). The pointers 142 and 146, to the locations in memory where space has been allocated for these two structures, respectively, are set. In step 228, field 138, indicating the maximum number of user languages, is set to a predetermined fixed value, e.g., four. The maximum amount of private memory field 140 is similarly initialized.

Processing continues with the step 230 of making an entry 116 in the user language correspondence table 114 for the language code 122 and language name 120 of the default operating system interaction language, as found in field 94 (FIG. 8) of the system information table 90. Field 118 is set to hold the first language code, e.g., '1'. Field 112 of the user language table 110 (FIG. 11) is set to '0'. The initialization of the per-user data structures is completed by step 234 of setting the user default interaction language for the operating system, and initializing the user language field 100 (FIG. 9).

After a user has been initialized, the data processing system is fully-enabled (if system configuration is complete) or otherwise privately-enabled for multi-lingual interaction with the user. If the system is merely enabled for private use, and is not configured for shared applications, no space is allocated for the shared data structures except for the system enablement table 90 (FIG. 8). In that table, the private enablement field 92 indicates that multi-lingual use is enabled for private applications. The default operating system interaction language (Field 94) is set to a non-language value, e.g., '−1'. The pointer 96 indicating the location of the system information table 70 is set to a 'null' value. The values in the user information table 130 are initialized to the values as indicated in column 133 (FIG. 13) and as described above in connection FIG. 20. The private system information for a user (FIGS. 9–13) is dependent upon the configuration of the shared system information (FIG. 5–8) at the time of the initialization for that user.

Figure 9:
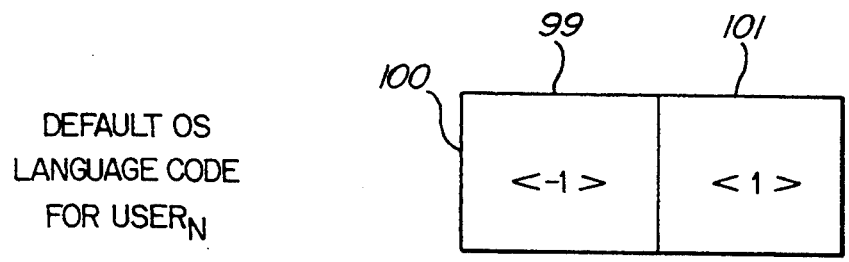
FIG. 9 is a diagram of a data structure for storing the language code for the user default language.

Another capability preferably provided by this data processing system is the ability for a user to change the user default language (see FIG. 21), found in user language field 100 (FIG. 9). The user interacts in the user default language with the operating system and with application programs invoked without specification of an alternate language. When the user requests a change of the user default language, it is first determined (step 370) whether the message file for the operating system for the desired interaction language has been mapped into memory. If it has not been mapped into memory an error is signalled in step 372. Otherwise, the user default language field 100 is set to the new user-indicated language. This language is then added to the user language table 110 in step 376. If the user language table 110 becomes full, it is expanded in step 378 in a manner to be described below in connection with FIG. 25. A message is then sent to the user at the user station 42 to inform the user whether the default language has been set.

While interacting with the data processing system, a user may invoke private and/or shared applications, possibly indicating a desired interaction language other than the user default language. This is useful when an application is available in a language which is not available for the operating system, i.e., which cannot be a user's default language. The process of invoking an application will now be described in connection with the flowchart of FIG. 22.

When an application is invoked, the readiness of the invoked application program to be executed is verified in step 242. If the system is not enabled for private multi-lingual interaction with private application programs, as verified in step 244, and at the invocation of the application program a desired interaction language is specified (determined in step 246), an error is signaled in step 248 and the invocation is aborted. If no desired interaction language is indicated, the application program is simply executed.

If the multi-lingual system is enabled for multi-lingual interaction with private application programs, as determined in step 244, the values of the language fields 134 and 136 (FIG. 13) are pushed onto the user nested language stack 102 (FIG. 10) and fields 134 and 136 are re-initialized to non-language values (step 240). It is then determined in step 250 whether a desired interaction language is indicated, and an argument is set in step 252 to the desired language. If no desired language is indicated, this argument is set to a 'null' value in step 254. Given an argument as set in either step 252 or step 254, a language is selected and a message file for this application program for the selected language was indicated, as determined in steps 257 and 258, an error is signaled in step 260 and the invocation of the application is aborted. If no desired interaction language is indicated, and no message file is found through step 256, the language code being returned indicates a non-language value and the appropriate field 134 and 136 (FIG. 13) is set (step 262). If a message file for an interaction language is found in step 256, the language field 134 and 136 are set to the returned language. If the invoked application is a private application program, the private language field 134 is set to the language code of the loaded message file and the shared language field 136 is set to a non-language value. Field 134 and 136 are conversely set for a shared application program.

Figure 23A:
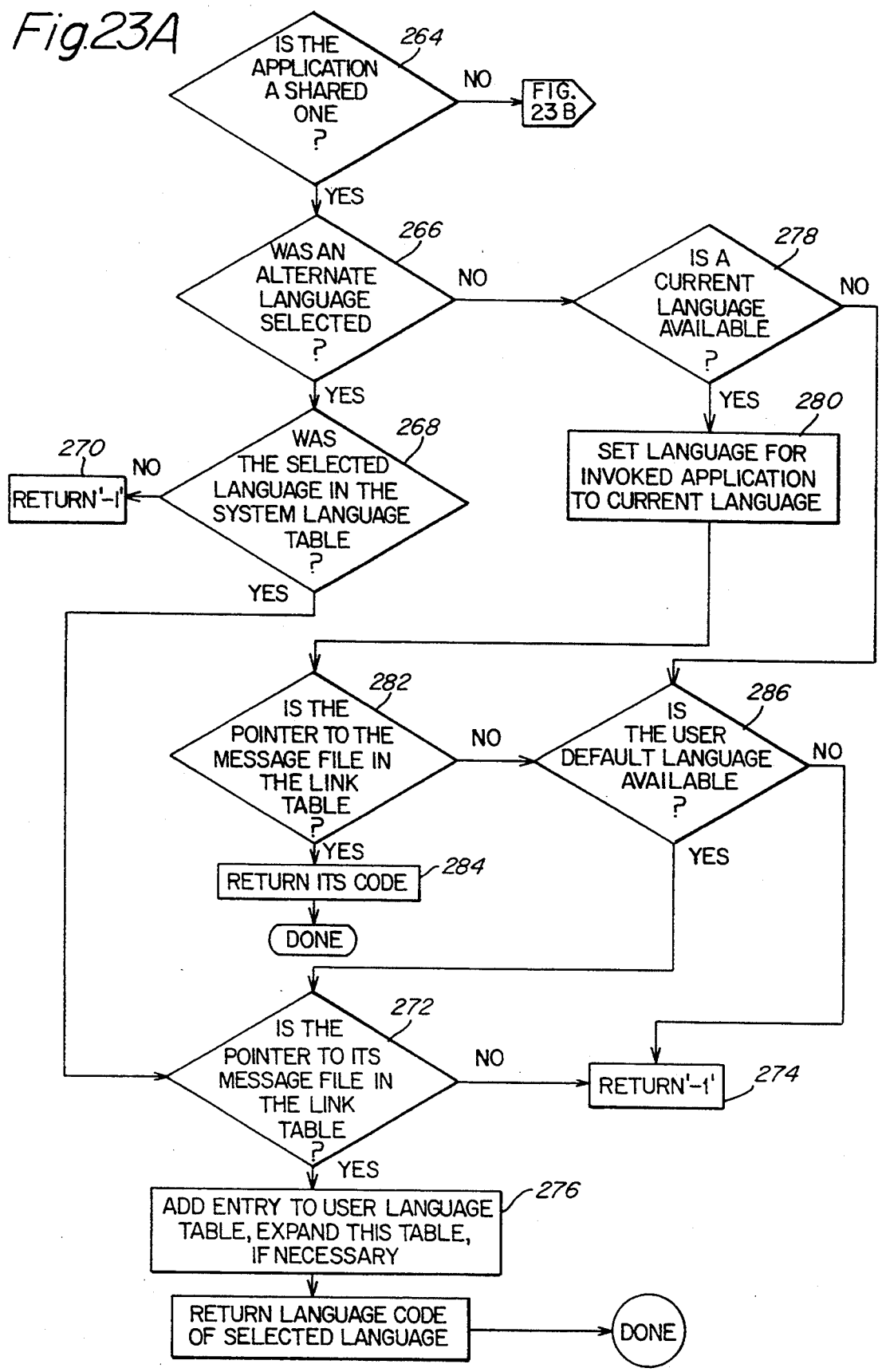

FIGS. 23A–B outline the process of selecting a language and finding and loading a message file for the selected language for the invoked application program. It is first determined, in step 264, if the application is a shared application program, for example, by checking the memory address where the procedure code is loaded. If it is not a shared application program, it is a private application program for which the method of selecting a language and finding and loading the message file is described in FIG. 23B. If the application program is a shared one, it is assumed that its message files are loaded, therefore only a language needs to be selected.

For a shared application, the process continues by examining the argument indicating the desired interaction language (step 266). If a desired interaction language was indicated, the system language table 76 (FIG. 7) is searched for this language (step 268). If the step 268 of searching fails to find the desired language, a non-language value is returned in step 270, indicating that the desired interaction language is not available for that shared application, because, when a shared application is loaded, its corresponding message files are loaded into shared memory 56 and entries for the corresponding languages are made in the system language table 76. Thus, if a desired interaction language for a shared application is not found in the system language table 76 that language is not available for that shared application.

If the language is found in the system language table 76, the shared link table 60 is examined (step 272) to determine if the message file for the desired interaction language is loaded into shared memory 56 for the shared application program. If a link is not found for the language and program in the shared link table 60, a non-language value is returned (step 274). If a link is found in the link table 60, during step 272, an entry 116 for this language is placed in the user language table 110 (FIG. 11) if none is already there. If user language table 110 is full, it is expanded, as will be described later in further detail in connection with FIG. 25 (step 276). If, referring back now to step 266, the interaction language argument was a non-language value, the current interaction language, as indicated by fields 134 and 136 (FIG. 13), is examined in step 278 to determine if in an interaction language is currently in use. If there is an interaction language currently in use, processing continues with step 280 of setting an argument to that current language value. If the current language is for a private application program, the system language code is retrieved from the user language correspondence table 114 If the language is for a shared application, the language argument is set to that value.

Processing continues with step 282 of searching for the message file in the shared link table 60, similar to step 272 previously described. If the message file is found in the link table 60, its corresponding language code is returned (step 284). Otherwise, processing continues with step 286. Step 286 is also performed if it is determined in step 278 that no interaction language is currently available. Step 286 involves the examination of the user default language, as indicated by user default language field 100 (FIG. 9). If the user default language code is a non-language value, a non-language value is returned in step 274, otherwise, the shared link table 60 is searched for the message file for this interaction language as previously done in step 272. The process for loading the message file is then completed by step 274 or step 276 as described above.

Referring to step 274 as described above, if the application program was determined to be a private application program processing continues with step 290 (FIG. 23B) of determining if a desired interaction language was specified. If an interaction language was specified, the user language table 110 (FIG. 11) is searched in step 292 for that language. If that language is found in the user language table 110, the private link table 60 is examined in step 294 to determine if the message file for this language is mapped into private memory 54. If the message file is mapped in, the language code is returned in step 296.

If the message file for the alternate language has not been mapped in, as determined in step 294, it is then determined whether this message file has been searched for previously, in step 298. If it has not been searched for previously, an attempt is made in step 300 to map in that message file for that interaction language. This attempt 300 is also made if the desired interaction language is not found, in step 292, in the user language table 110. If the attempt to map in that message file, in step 300, is successful, the language code for the message file is returned in step 302. If that message file is not found, processing continues with step 304, to be described later. Also, if in step 298 it is determined that a message file for an interaction language previously has been sought, processing also continues with step 304 to be described later.

Referring back now to step 290, if no desired interaction language is indicated, language fields 134 and 136 are examined, in step 306, to determine if an interaction language is currently being used. This step 306 of determining is similar to step 278 previously described in connection with the flowchart of FIG. 23A. If there is an interaction language currently being used, it is selected and processing continues with step 294, as previously described. Otherwise, processing continues with the step 304 of determining whether there is an interaction language selected by the user for use with the operating system, by examining user language field 100 (FIG. 9). If user language field 100 indicates a non-language value, e.g., '−1', a non-language code value is returned in step 307. Otherwise, the private link table 60 is examined to determine if the message file for the language indicated by field 100 has been mapped into private memory 54. (Step 308). If the file has been mapped into private memory, the language code is returned in step 310. Otherwise, an attempt 312 is made to map that language into private memory 54. If the attempt 312 is successful, the language code of the mapped message file is returned in step 310. Otherwise, a failure is indicated and a non-language value, e.g., '−1', is returned.

Figure 12:
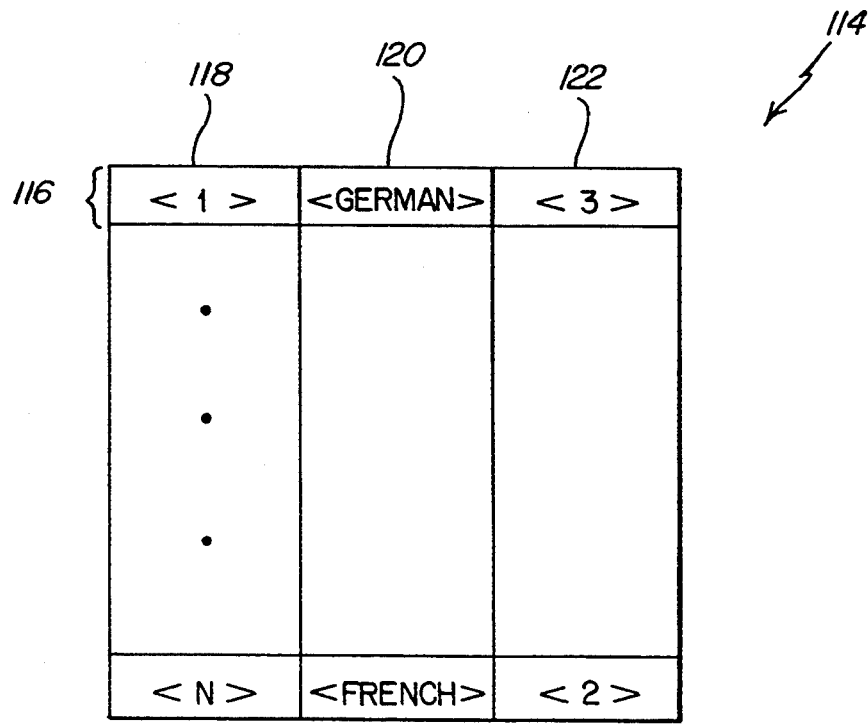
FIG. 12 is a diagram of a data structure of a user language correspondence table for storing interaction language names and codes for a user, and corresponding system codes.
Figure 24:
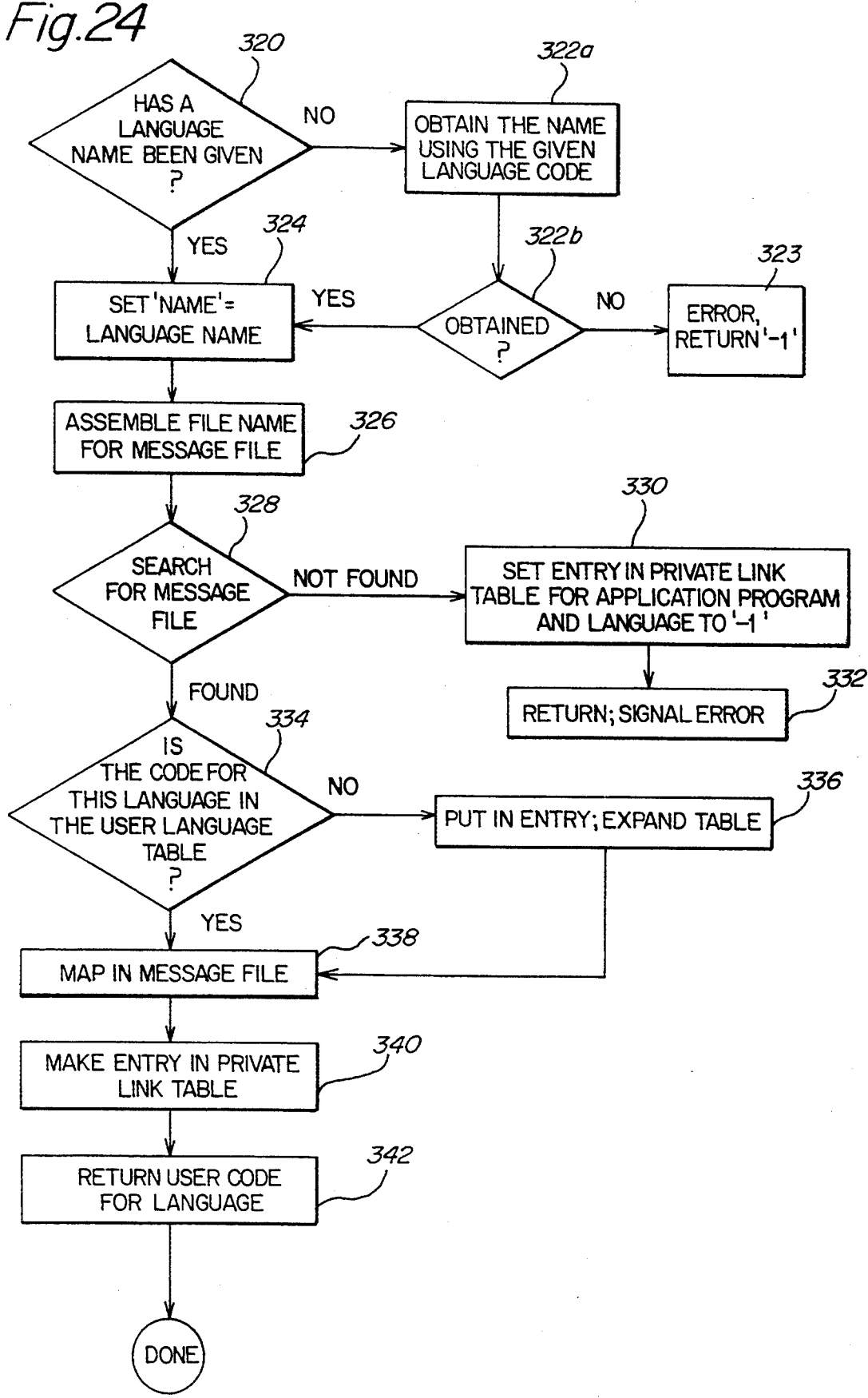
FIG. 24 is a flowchart describing how a message file for an application program may be mapped into per-user memory.

The process of mapping a message file into per-user private memory 54 (steps 300 and 308 of FIG. 22B) will now be described in further detail in connection with FIG. 24. This process depends upon the reception of an argument indicating the desired language, which argument is examined in step 320 to determine if the argument is a language code or a language name. If the argument is not a language name, processing continues with step 322 of obtaining the name of the language corresponding to the given language code. Step 322 of obtaining the name is performed using the user language correspondence table 114 (FIG. 12). If the language name is not found in step 322, an error is returned (step 324). Otherwise, processing continues with step 324 of setting an argument, e.g., "name", to the language name which is either given or obtained from a given language code. From the argument, "name", a file name for the desired message file is assembled. The format of this file name is dependent upon the specific operating system of a given data processing system. However, this file name normally indicates the name of the application program, as well as the language name requested. (step 326). The assembly of the file name is followed by the step 328 of searching for the message file in the permanent memory (e.g., disk) of the data processing system. If the message file is not found, an entry 64 is made in the private link table 60 (step 330). This step 330 of making an entry includes setting the field 62 to indicate the invoked application program, setting the language field 68 to the desired interaction language, and setting the message file pointer field 66 to a non-null, and non-pointer value, thus indicating that the message file has been searched for but was not found (step 330). Subsequently, an error is signalled in step 332. If the message file was found, the user language correspondence table 114 (FIG. 12) is searched for the language code corresponding to the name of the desired interaction language (step 334). If an entry is not found for this language code, in step 334, an entry 116 is made, setting the user language code field 118 to the given code, the language name field 120 to the interaction language name, and field 122 to the system code to which the language corresponds, from the system language table 76 (FIG. 7) (Step 336). Step 336 of making an entry also includes expanding the user language table 110 if it is full. This table expansion is described later in further detail in connection with FIG. 25. Once it is verified that the language is entered in the user language correspondence table 114, through steps 334 and possibly step 336, the message file for the desired interaction language is mapped to per-user private memory 54 in step 338. An entry 64 is then made in the private link table 60 in which the message file pointer field 66 is set to indicate the location into which the message file was mapped in step 338. Finally, in step 342, the per-user language code for the desired interaction language is returned.

Figure 25:
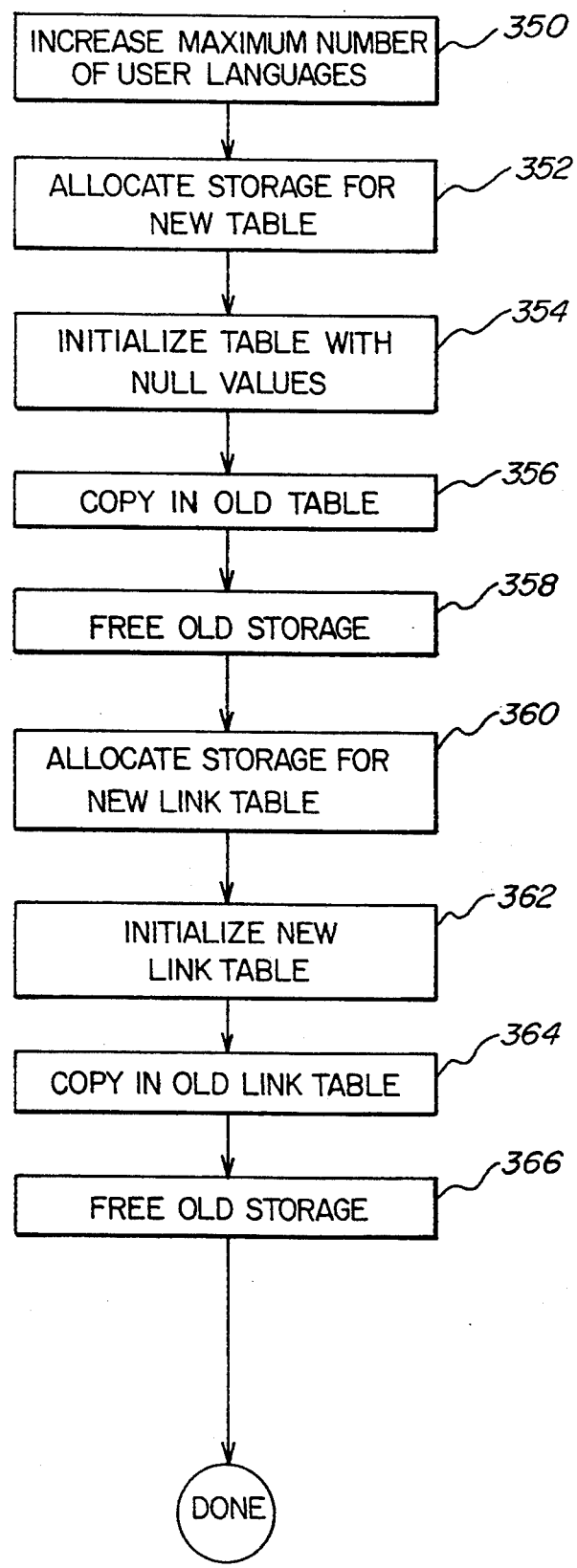
FIG. 25 is a flowchart describing how a user language table may be expanded.

The process of expanding the size of the user language table 110 (FIG. 11) (steps 336 of FIG. 24, 276 of FIG. 23A and 378 of FIG. 21) will now be described in further detail in connection with FIG. 25. This process begins with the step 350 of increasing the maximum number of possible user languages, as indicated in field 138 of the user information table 130. Increasing the number of user interaction languages is followed by the step 362 of allocating more storage for a larger user language table 110. Next, this new table is initialized (step 354) to null values. When the table is initialized, the data in the old user language table 110 is copied into the new table (step 356). After the old values are copied into the new table, the old storage may be freed, in step 358.

If the number of user languages is increased, the size of the private link table 60 may also increase. Therefore, storage for a new link table 60 is allocated in step 360, followed by the step 362 of initializing the new link table 60 with null values, copying in old data in step 364, and then freeing the storage for the old link table 60. In this manner, the size of the private link table 60 and the user language table 110 may grow dynamically. The frequency of the expansion of these tables is minimized by expanding them by four entries at a time, rather than just by one.

During the execution of an application program, a message may be sent to a user in the interaction language requested thereby. Given a standard output function used by an application programmer for a typical data processing system, such a function may be modified to enable it to find the correct message in an established interaction language for the user. In the first step 390 it is determined whether the application program is shared or private. After this determination, the enablement status is checked by examining the system enablement table 90 to verify that the system is either fully-enabled for a shared application or privately-enabled. These verification steps are steps 392 and 394, respectively. If the system is not properly enabled for multi-lingual interaction, a message pointer is set to a null value, as if no multi-lingual message was found, in step 396. If the system was determined to be fully-enabled for a shared application in step 392, processing continues with step 398 of finding the message in the shared message file. Step 398 of finding the message will be described in further detail later in connection with FIG. 27. If the system was determined to be privately-enabled in step 394, processing continues with step 397 of finding the message in the private message file, the process of which is described in more detail later in connection with FIG. 28.

After the completion of one of the either steps 396, 397 or 398, the message pointer is either null or indicates the location of the desired message. It is next determined in step 400 if a message was found by examining this pointer. If a message was not found, i.e., the message pointer is null, processing continues with step 402 of handling the output of a default message. Otherwise, processing continues with step 404 of returning the desired value for the message. This value may be the pointer to the message, the message string itself, the message placed in a buffer or the message string sent to a user at the corresponding user station 42.

Figure 26:
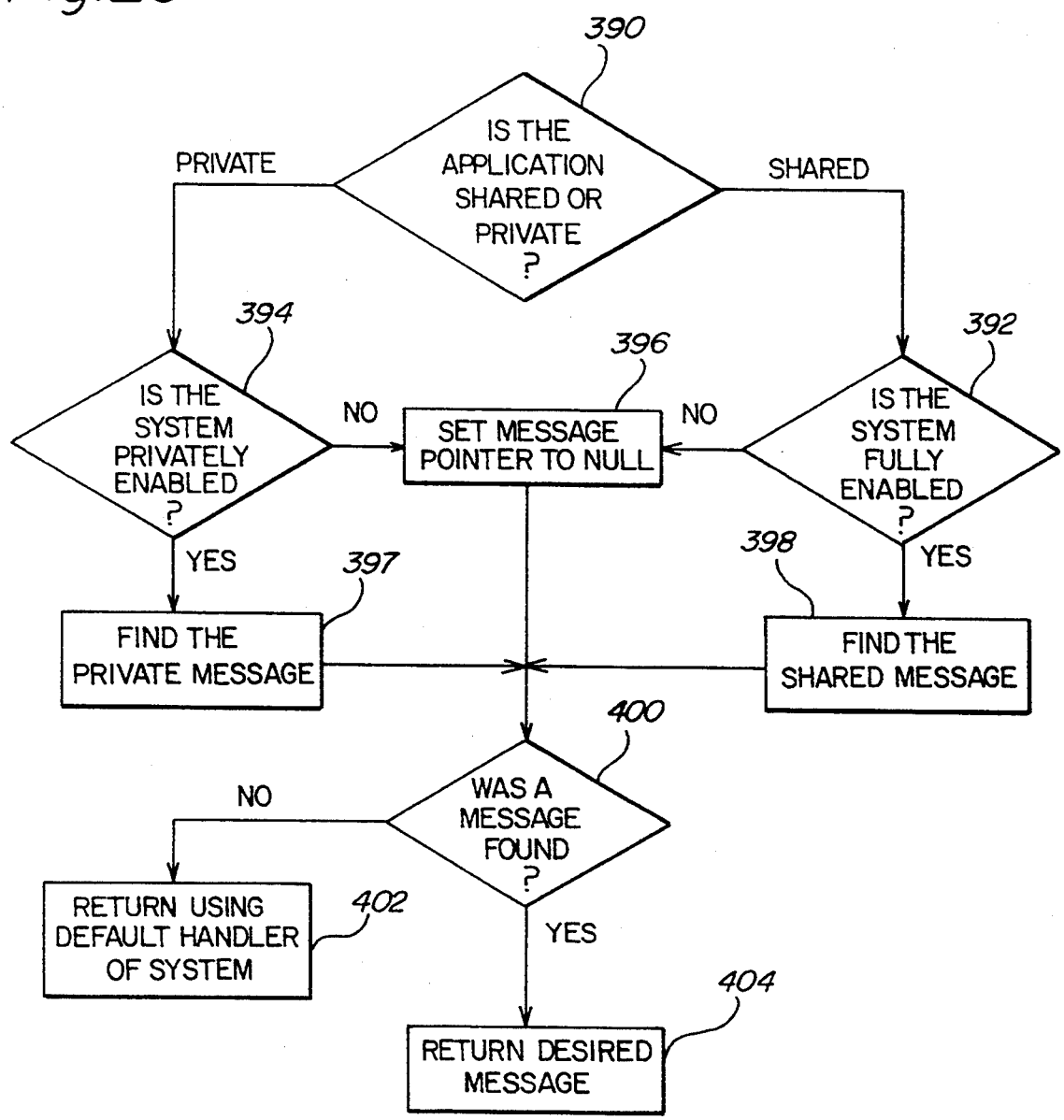
FIG. 26 is a flowchart showing the steps for finding a message for a standard output function.
Figure 27:
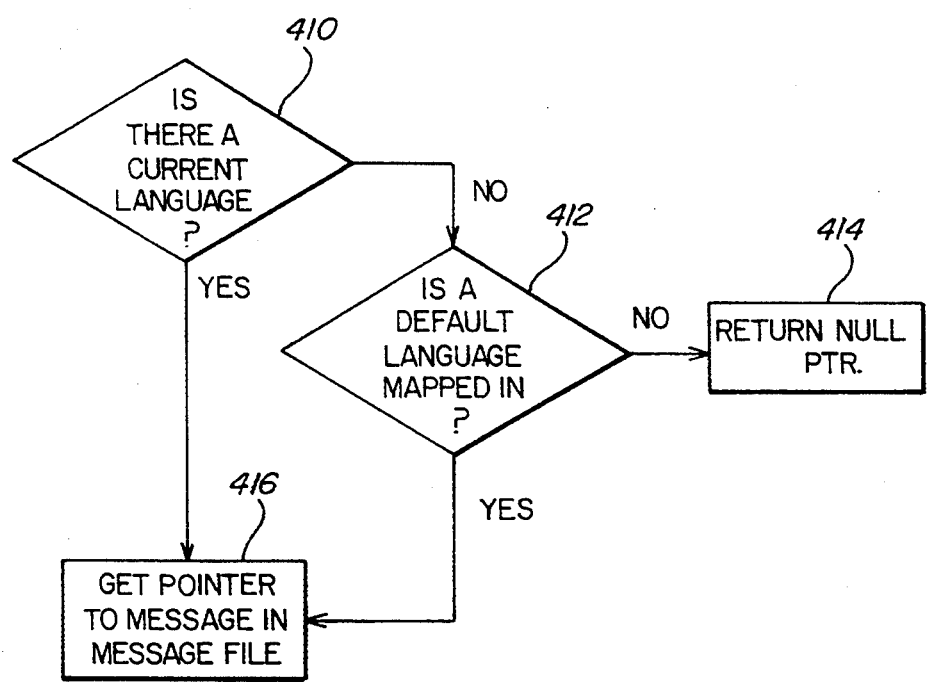
FIG. 27 is a flowchart showing the steps for finding a message for a shared application program.
Figure 28:
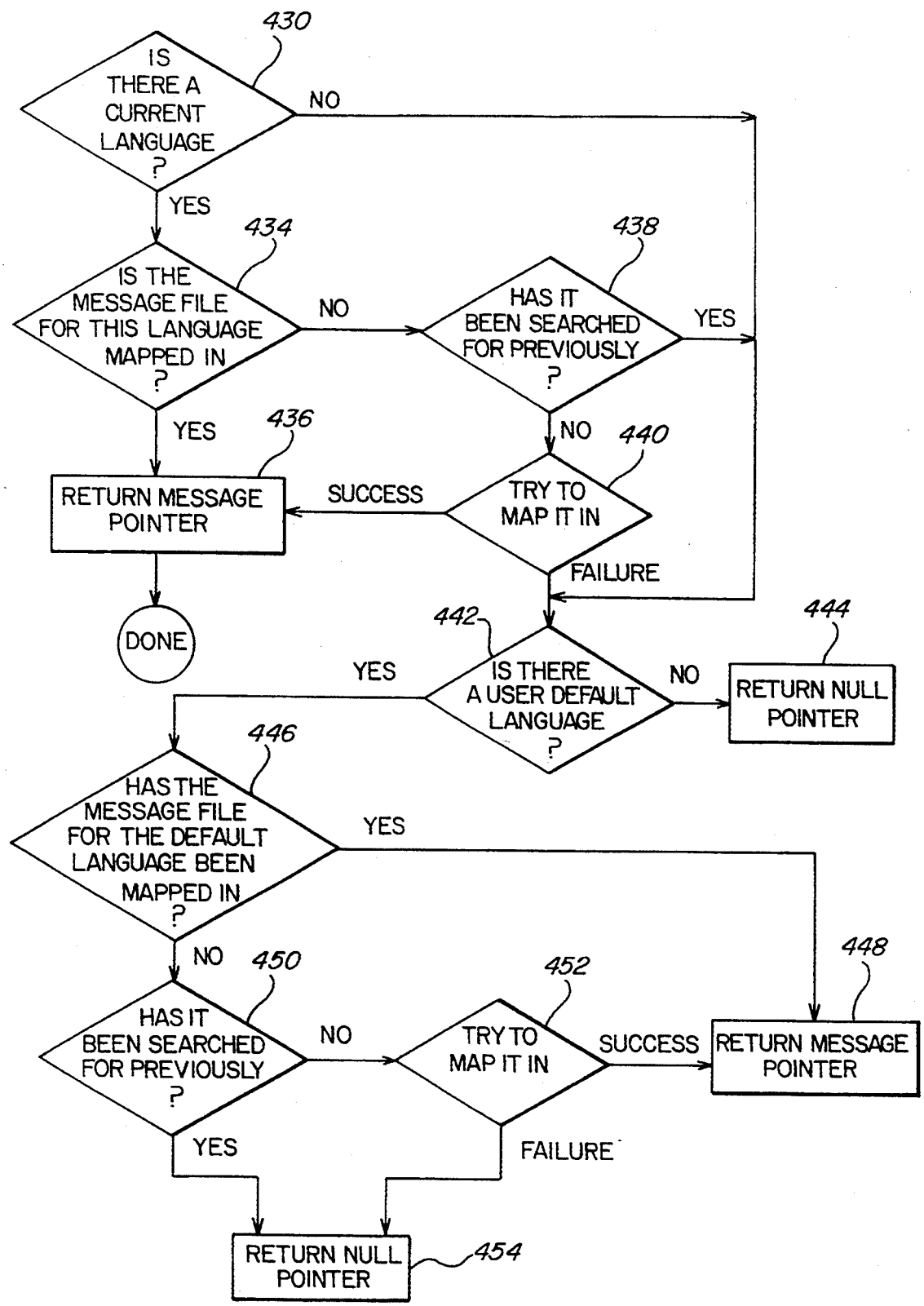
FIG. 28 is a flowchart showing the steps for finding a message for a private application program.
Figure 29:
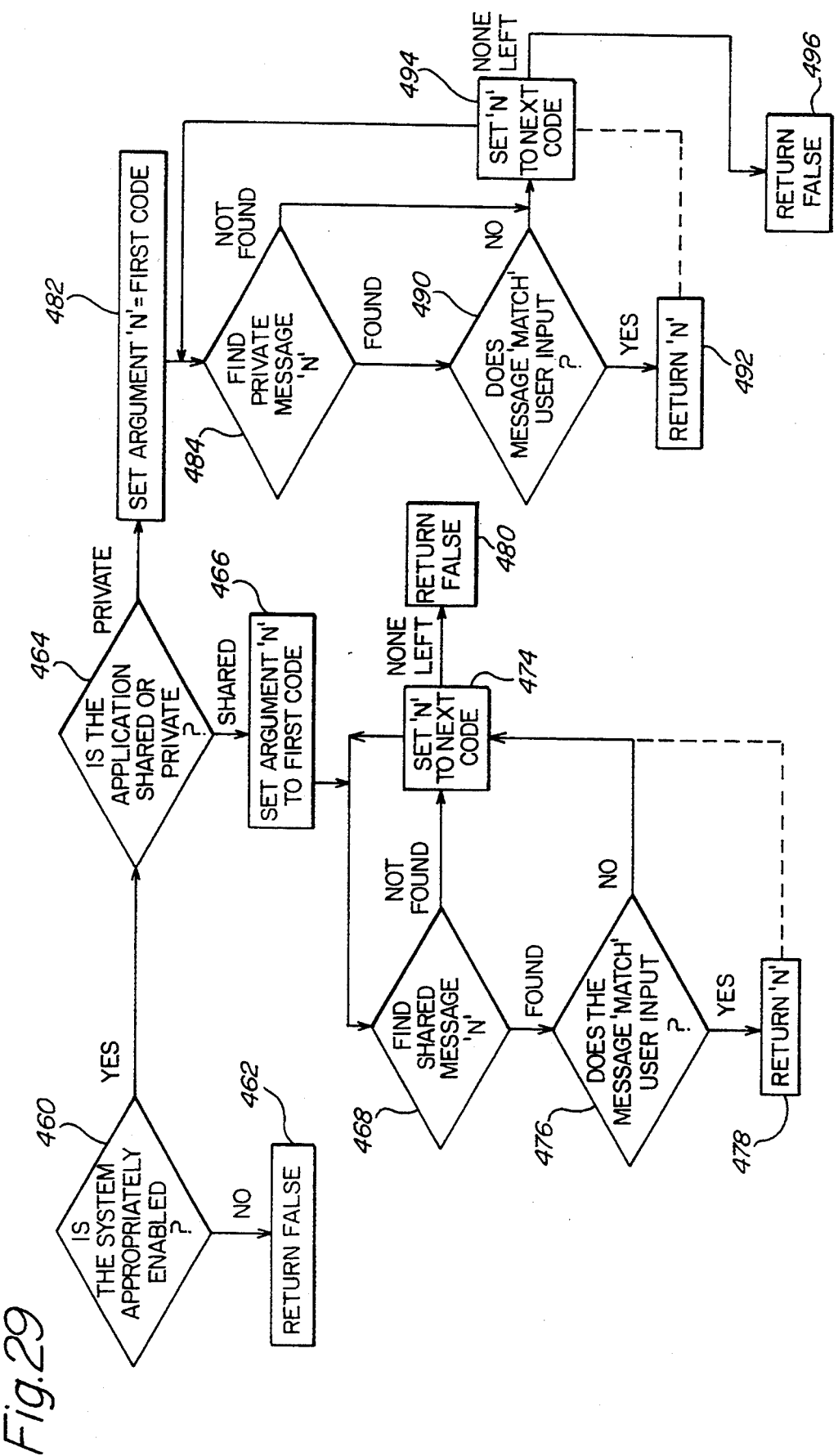
FIG. 29 is a flowchart describing how natural language input from a user may be understood by the data processing system.

The process of finding a message from a shared application program message file step 408, FIG. 26) will now be described in further detail in connection with FIG. 27. The first step of finding the message is determining (step 410) if there is an interaction language currently being used for this application program. Step 410 of determining includes the examination of fields 134 and 136 (FIG. 13) which indicate the language codes of currently running private or shared application programs. If both fields indicate non-language values, the process continues by determining (step 412) whether the message file for the operating system default language is mapped into memory for this shared application program. If this message file is not mapped into memory, a null message pointer is returned in step 414. Otherwise, the pointer to the message file is retrieved from the link table 60 for shared applications, and the pointer to the desired message is retrieved from that message file (Step 416). If a current interaction language is available for an application program, as determined in step 410, the pointer to the message file and subsequently the message are retrieved on step 416.

The process of finding a message from a message file for a private application program (step 396, FIG. 26), begins with step 430 (FIG. 28) of determining whether a current interaction language is being used for an application program. This step 430 of determining is performed by examining fields 134 and 136 (FIG. 13) which indicate the language code in which a current application program is interacting with a user. It is next determined, in step 434, whether the message file in the current language for this application program has been mapped into private memory 54, by examining the private link table 60 and retrieving the entry 64 for this application program and the message file pointer field 66 (FIG. 5). If the message file is mapped in to private memory, the pointer indicating the location of the message file in private memory 54 may be used to return a pointer to the desired message, through step 436.

If it was determined (step 434) that the message file is not mapped into private memory, it is determined in step 438 whether it was searched for previously in step 438. If it has been searched for previously, field 66 indicates a non-null and non-pointer value, as set in step 330 of FIG. 24. If there had not been an attempt to find this message file previously, an attempt is made in step 440 to map it into private memory. This step 440 of mapping the message file into private memory is described above in more detail in connection with FIG. 24. If the attempt of mapping is successful, the message file pointer field 66 is set and used to return a pointer to the desired message in step 436 as previously described.

If the attempt 440 to map the message file into private memory fails, or such an attempt was determined in step 438 to have been made before, or if it was determined in step 430 that no current interaction language is indicated for the application program, processing continues with step 442 of selecting the user default language as indicated by user default language field 100 (FIG. 9). If no language has been set, a null pointer is returned in step 444. Otherwise, it is determined (step 446) whether the message file in the user default language for this private application program has been mapped into private memory 54 by examining the private link table 60. If a pointer to this message file is returned, from field 66 (FIG. 5), the pointer to the message may be retrieved from the message file in step 448, similar in manner to step 436 as described above. If the message file is found not to have been mapped into private memory, the process continues with the step 450 of determining whether it has been searched for previously, in a manner similar to that of step 438 as described above. If this message file was searched for previously, a null pointer is returned in step 454. Otherwise, an attempt is made in step 452 to map this message file into private memory 54, as previously described in connection with FIG. 24. If this attempt 452 is successful, a pointer to the desired message may be retrieved using a location of the message file in the private memory, as in step 448. If the attempt 452 fails, a null pointer is returned in step 454.

The capability for the system to respond to natural language input from a user using a user station 42 may also be provided. Standard input processing functions may be modified to include the following steps as described in connection with FIG. 29. For this process, a message file also includes possible natural language input from a user, e.g., "yes," "no", and "quit". These input messages may be included in the message file along with output messages. The first step of processing natural language input involves the step 460 of determining whether the multi-lingual capabilities of this system are suitably enabled according to the type (i.e., shared or private) of the application program. If this capability is not enabled, a false value is returned in step 462. The type of the program may be determined by examining the memory location in which it is stored. The enablement status may be determined from the system enablement table 90 (FIG. 8); and in particular field 92 for private applications and field 96 for shared applications. If the application program is determined to be a shared one and the system is fully-enabled, the process continues with step 466 of setting the first message to be compared to the input from the user. Normally, an application programmer would expect input from a user to correspond to one of a finite set of possible input messages. The application programmer may then compare the input to each of these expected responses. Step 466 sets an argument 'N' to the first of these expected messages. The process continues with step 468 of finding this expected message in a message file. If the message is not found, the next expected message is searched for in steps 474 and 468. If a message is found, this message is compared to the input from the user in step 476.

The step 476 of matching the retrieved message to the input from the user may be performed in one of a variety of ways; a match may be partial, similar, or exact. If the message matches a user's input, the message, the input, or a true value may be returned in step 478. It is possible to continue this comparison search in order to find other matches to messages and return a list of partial matches rather than a single, and first match. If the user's input does not match the retrieved expected message, the next expected message is retrieved in step 474 and processing continues with step 468 as described above. If there are no remaining expected messages and none have been found to match the user's input, a false value is returned in step 480. This step 480 may alternatively return the list of partial matches previously found. In this case, this list is initialized to a false value.

In the case of user input for a private application program when the system is at least privately enabled, the process of matching the message begins with step 482 of selecting the first expected message. The process continues with step 484 of finding the message in the message file for this private application program. The remainder of the steps 490, 492, 494, 496 for this process for matching the input to a message are similar to the steps 476, 478, 474, 480 for finding a message for a shared application program. In either case a user's natural language input may be matched to a set of expected inputs thus enabling full natural language interaction between a user and the data processing system.

Figure 30:
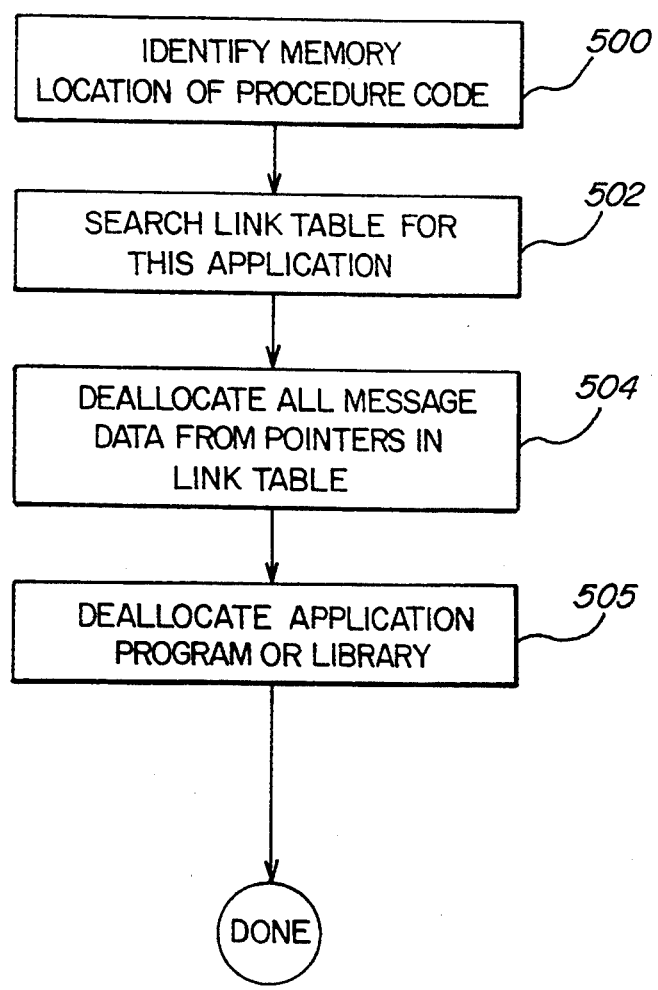
FIG. 30 is a flowchart describing how an application program or library and its message files may be removed from memory or use.

At some point in time, it may be desirable to remove an application program or library and its message files from memory or from use. (FIG. 30). The first step 500 of removing an application from use is the identification of the location in memory of the procedure code or other identifier of the application program. The identifier found in step 500, is used as a search index to the link table 60 in step 502, and the entry 64 is retrieved. The corresponding message file, as indicated in field 66, is de-allocated and entry 64 is removed from the link table 60 (step 504). The application program or library itself may then be de-allocated (step 505).

Figure 31:
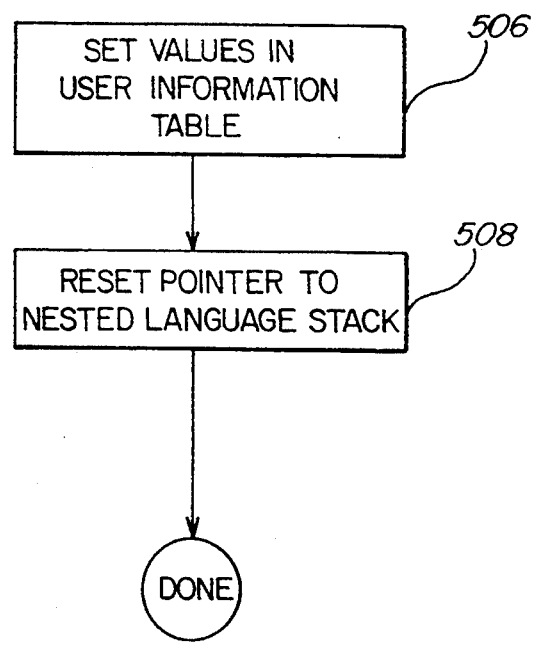
FIG. 31 is a flowchart describing how an application program level may be restored after the completion of a nested call.

If an application program is a nested one, i.e., invoked by another application program, the program level is restored as illustrated in FIG. 31. The user nested language stack 102 is used to retrieve an entry 104 for the application program which was previously running. This entry 104 (FIG. 10) is used to set fields 134 and 136 (FIG. 13) of the user information table 130 which indicate the interaction language in which the current application program was running (step 506). The pointer 132 to the nested language stack (FIG. 13) is then reset to the next entry 104 in the stack 102 (step 508).

It may also be desirable for a multi-lingual data processing system to enable a user to obtain a list of interaction languages which are available for an application program. Two types of lists are possible. The first of these lists includes the languages for an application program for which message files are mapped or loaded into private or shared memory. The other type of list is a list of the interaction language message files which exist on disk for a given application program. The first is desirable primarily for shared applications. The second is preferable for private applications whose message files are not all mapped into private memory.

Figure 32:
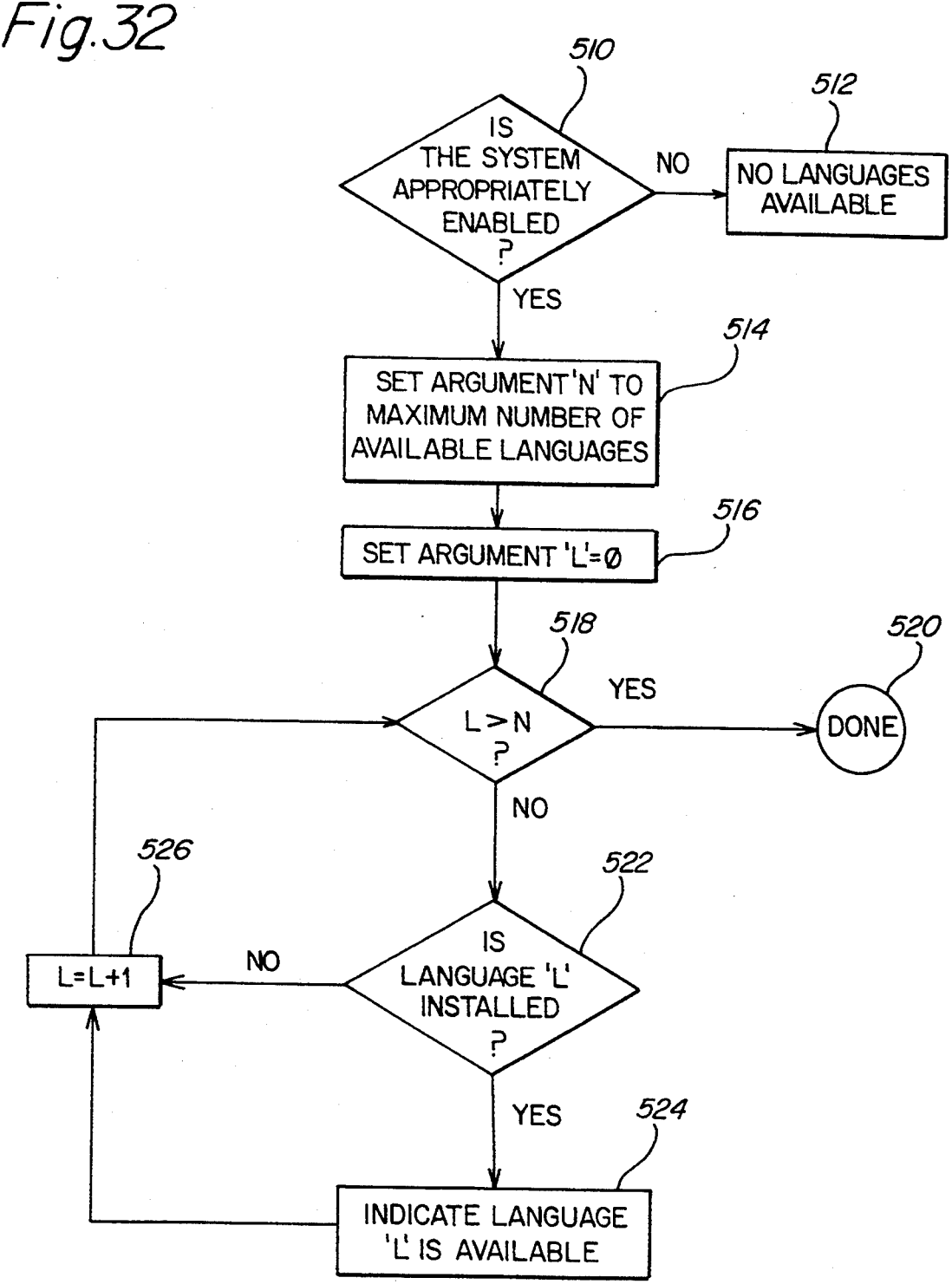
FIG. 32 is a flowchart describing how a list of existing interaction languages for an application program may be provided.

The first type of list will now be described in connection with FIG. 32. This construction begins with the step 510 of determining whether the multi-lingual interaction is suitably enabled on the system for the type of the application program. If it is not enabled, the user is notified that no languages are available for the application (step 512). Otherwise, an argument, e.g., 'N', is set (step 514) to the maximum number of languages, as found in field 72 of the system information table 70 (FIG. 6) (step 514). A second argument, e.g., 'L', is set to '0' (step 516). The second argument is then compared to the first argument in step 518. If the second argument 'L', is greater than the first argument 'N', indicating that the number of languages searched for is greater than the number of maximum languages, the process ends (step 520). Otherwise, it is determined whether the message file for the interaction language having a language corresponding to the second argument 'L' is installed by examining the appropriate link table 60 and examining the message file pointer field 66 for that application program 62 and language 68 (FIG. 5). If the message file for the language was found to be loaded in step 522, a message, in the appropriate interaction language, is sent to the user in step 524, indicating that the language corresponding to this second argument 'L', is available. If the language is not installed or, after the message has been sent to the user indicating that it is installed, the second argument 'L', is incremented, in step 526, and processing continues with the comparison of step 518 as previously described. In this manner, the user receives a stream of output messages at the user station indicating which languages are available for the selected application program.

Figure 33:
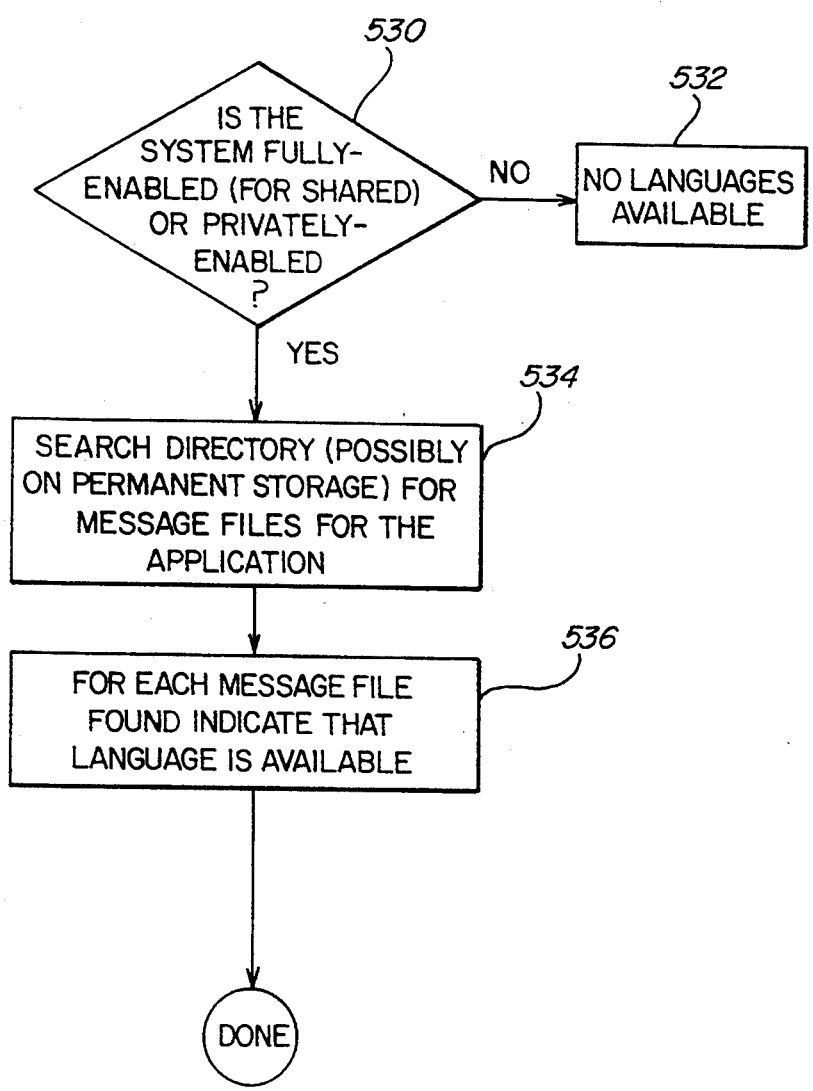
FIG. 33 is a flowchart describing how a list of available interaction languages may be provided.

The construction of the second type of list of available interaction languages will now be described in connection with FIG. 33. The first step of this construction is step 530 of determining whether multi-lingual interaction has been enabled on the system. If it has not been enabled, a message is sent to the user indicating that no languages are available, in step 532. Otherwise, the memory 53 of the data processing system is searched in step 534, in order to find the message files for a given application program. This search is performed using a file name as based upon the application program and the file type of a message file while accepting any language name which is part of the message file. For each message file found in step 534, the language name corresponding to that message file is made part of a message which is sent to the user to indicate that that interaction language is available for the given application program (step 536).

With the above described embodiment, a user may specify a desired interaction language, after which interaction with the data processing system may be performed in that language, if that language is available for a given application program. Such a system may be especially useful in a variety of multi-lingual environments.

Having now described an embodiment of the invention, it should be apparent to those skilled in the art that the foregoing description is illustrative only and not limiting, having been presented by way of example only. Numerous other embodiments and modifications thereof are contemplated as falling within the scope of the present invention as defined by the appended claims and equivalents thereto.

What is claimed is:

1. A data processing system providing interaction in multiple natural languages between a user and application programs, wherein an application program requests one of a plurality of messages specific to the application program to be output to the user, comprising:
   a processor for executing the application programs;
   a memory connected to the processor and for storing the application programs and data, the data in the memory including:
     a plurality of message files, each message file being stored in a location in the memory and including the plurality of messages for one of the application programs in one natural language, different message files being provided for different application programs and different natural languages;
     a link table for maintaining a plurality of links between the application program and the message files, wherein a link includes values indicative of an application program, a natural language, and the location in the memory of a message file associated with the application program and the natural language;
     an indication of a current interaction language; and
     an indication of a default language; and
   the processor further including:
     means, operative in response to a request from one of the application programs for a message specific to the application program to be output to the user, for selecting a natural language from the current interaction language and the default language; and
     means, responsive to the selection of the natural language, for retrieving the requested message specific to the application program from the message file, including means for searching the link table to find the link indicative of the location in the memory of the message file referenced by the application program and the selected natural language, means for accessing the message file indicated by the link, and
   means for obtaining the requested message specific to the application program from the message file.

2. The system of claim 1, further comprising means, external to the application programs, for outputting the message obtained from the message file to the user.

3. A data processing system as set forth in claim 1, wherein the processor may nest application programs, and further including:
   means for storing language information for nested application programs; and
   means responsive to an invoking of another application program by the application program for saving the stored current interaction language in the means for storing nested language information, and for setting the current interaction language to a desired interaction language.

4. A data processing system as set forth in claim 3, wherein the processor is controlled by an operating system which operates in response to instructions in the application program, and further including:
   means for loading the message file for the desired interaction language for the invoked application program into the memory; and
   in the operating system, means for establishing a link in the link table responsive to the means for loading a message file.

5. A data processing system as set forth in claim 4, further including means for selecting the desired interaction language from the current interaction language and a default interaction language.

6. A data processing system as set forth in claim 5, wherein:
   said command to invoke another application program includes an intended interaction language; and
   said means for selecting the desired interaction language further selects from the intended interaction language.

7. A data processing system as set forth in claim 6, further including:
   means responsive to a termination of the invoked application program for setting the current interaction language to a previous interaction language from the means for storing nested language information; and
   means for removing the previous interaction language from the means for storing nested language information.

8. A data processing system as set forth in claim 7 wherein the means for storing nested language information is a stack.

9. A data processing system as set forth in claim 7 wherein the means for storing nested language information is a linked list.

10. A data processing system as set forth in claim 1, wherein said means for selecting a natural language is responsive to a command by a user to invoke an application program using a desired interaction language for setting the current interaction language to the desired interaction language if a message file containing messages in the desired interaction language is available and for setting the current interaction language to a default interaction language if the desired interaction language is not available.

11. A data processing system as set forth in claim 10, wherein the processor is controlled by an operating system which operates in response to instructions in the application program, and further including:
   means for loading the message file for the selected natural language for the invoked application program into the memory; and in the operating system, means for establishing a link in the link table responsive to the means for loading a message file.

12. The system of claim 1 wherein the value indicative of an application program in the link table is a location of the application program in the memory.

13. The system of claim 12, wherein the means for retrieving a message from the message file includes means, within the operating system and responsive to a current application program outputting an output value, for identifying the current application program, and for searching the link table for a link indicative of the current application program.

14. A data processing system providing interaction between a user and application programs in multiple natural languages, wherein an application program requests one of a plurality of messages specific to the application program to be output to the user, comprising:

a processor for executing an operating system and the application programs;

a nonvolatile storage device coupled to the processor;

a memory, coupled to the processor, for storing the application programs and data, the data in the memory including:

at least one message file associated with an application program, each message file having a location in the memory and containing messages specific to the application program in one natural language;

a link table for maintaining a plurality of links between a plurality of application programs and a plurality of message files, each link including values indicative of an application program, a natural language, and a pointer to the location in the memory of a message file;

the processor further including:

means for loading a message file for the application program from the nonvolatile storage device into the memory;

in the operating system, means, operative in response to the loading of a message file, for establishing a link in the link table between the application program, the pointer to the location in the memory of the message file, and the natural language of messages in the message file; and in the operating system, means, operative in response to a request for a message by the application program, for accessing the link for the application program and the natural language, for locating the message file indicated by the link, for retrieving a message specific to the application program from the message file, and for outputting the message retrieved from the message file to the user.

15. A data processing system as set forth in claim 14, further including:

means responsive to a command for instructing the processor to execute the application program;

means for selecting an interaction language; and wherein said means for loading a message file, responsive to the means for instructing, loads the corresponding message file for the selected interaction language.

16. A data processing system as set forth in claim 15, further including means for storing a default language and wherein the command for instructing the processor includes an intended interaction language, and the means for selecting an interaction language selects from the intended interaction language and the default interaction language.

17. A data processing system as set forth in claim 16, wherein the command for invoking the application program is issued by another application program, and further including:

means for storing a current interaction language;

means for storing nested language information; and means responsive to the means for invoking the application program for setting the current interaction language to the selected interaction language and for saving a previous current interaction language in the means for storing nested language information.

18. A data processing system as set forth in claim 17, wherein the means for selecting the interaction language further selects from the previous current interaction language. further selects from the previous current interaction language.

19. A data processing system as set forth in claim 18, further comprising:

means responsive to a command by the application program to retrieve a message for selecting a natural language and for retrieving said message from the message file containing messages in the selected natural language.

20. A data processing system as set forth in claim 19, wherein said means for selecting a natural language selects from the current interaction language and the default language.

21. A data processing system as set forth in claim 20, further including:

means responsive to a termination of the application program for setting the current interaction language to the previous interaction language from the means for storing nested language information; and means for removing the previous interaction language from the means for storing nested language information.

22. A data processing system as set forth in claim 21 wherein the means for storing nested language information is a stack.

23. A data processing system as set forth in claim 21 wherein the means for storing nested language information of a linked list.

24. The system of claim 14, wherein the value indicative of an application program in the link table is a location of the application program in the memory.

25. A data processing system for providing interaction between a user and a plurality of nested application programs in a plurality of natural languages, comprising:

a processor for executing the nested application programs;

a memory for storing the nested application programs and data, the data including:

a nested language information table for maintaining a correspondence between at least one of the nested application programs and a natural language in which the at least one of the nested application programs is to interact with the user;

the processor including:

means, responsive to an execution by the processor of a first nested application program, for assigning a first value to a current interaction language identifier, the first value specifying a natural language in which the first nested application programs is to interact with the user;

means, responsive to the first nested application program invoking a second nested application program, for saving the value of the current interaction language identifier in the nested language information table, and for setting the value of the current interaction language identifier to a second value specifying a desired interaction language for the second nested application program; and means for interacting between the first nested application program and the user in the natural language specified by the first value, responsive to the first nested application program being executed by the processor, and for interacting between the second nested application program and the user in the natural language specified by the second value, responsive to the second nested application program being executed by the processor.

26. A data processing system as set forth in claim 25, further including means for storing a default language, wherein the means for setting the value of the current interaction language identifier to a second value specifying a desired interaction language includes means for selecting the desired interaction language from the current interaction language and the default language.

27. A data processing system as set forth in claim 26, wherein:

said means for invoking a second nested application program includes an intended interaction language; and said means for selecting the desired interaction language further selects from the intended interaction language.

28. A data processing system as set forth in claim 27, further including:

means responsive to a command by the application program to retrieve a message for selecting a natural language from the current interaction language and the default language and for retrieving said at least one message from the message file containing messages in the selected natural language.

29. A data processing system as set forth in claim 28, further including:

means responsive to a termination of said second nested application program for setting the current interaction language to the previous interaction language from the nested language information table; and means for removing the previous interaction language from the nested language information table.

30. A data processing system as set forth in claim 29 wherein the means for storing nested language information is a stack.

31. A data processing system as set forth in claim 29 wherein the nested language information table is a linked list.

32. A computer-implemented method for providing user interaction in multiple natural languages, in a computer system having a processor for executing a plurality of application programs and a memory, coupled to the processor, for storing at least one message file, wherein a message file includes messages for one of the application programs and one natural language, different message files being provided for different application programs and different natural languages, the computer system further having a link table for maintaining a plurality of links between the application programs and the message files, wherein a link stores values indicative of an application program, a natural language, and a location of a message file associated with the application program and the natural language in the memory, the method comprising the processor, external to the application program, performing the steps of:

selecting a natural language responsive to a command to retrieve a message by the application program;

accessing the link table to find the location in the memory of the message file for the application program in the selected natural language;

finding the message file at the location indicated in the link table;

retrieving, said message from the message file containing messages in the selected natural language for the application program; and outputting the retrieved message to the user.

33. A method as set forth in claim 32, further including the steps of:

storing a current interaction language; and storing a default language, wherein said step of selecting a natural language includes selecting from the current interaction language and the default language.

34. A method as set forth in claim 32, further including the steps of:

storing a current interaction language;

storing nested language information; and setting the current interaction language to a desired interaction language responsive to a command by the application program to invoke another application program, and saving a previous current interaction language with the stored nested language information.

35. A method as set forth in claim 34 further including means for loading the message file for the current interaction language for the invoked application program into a memory; and establishing a link in the link table responsive to the step of for loading a message file.

36. A method as set forth in claim 35, further including the step of selecting the desired interaction language from the current interaction language and a default interaction language.

37. A method as set forth in claim 36 wherein the step of selecting the desired interaction language includes the step of loading the message file for the desired interaction language for the invoked application program into a memory; and further including the step of establishing a link in the link table after the step of loading the message file.

38. A method as set forth in claim 37, wherein:

said command to invoke another application program includes an intented interaction language; and said step of selecting the desired interaction language further includes selecting from the intended interaction language.

39. A method as set forth in claim 38, further including the steps of:

setting the current interaction language responsive to a termination of the invoked application program to a previous interaction language from the stored nested language. information; and removing the previous interaction language from the stored nested language information.

40. A method as set forth in claim 39 wherein the stored nested language information is stored in a stack.

41. A method as set forth in claim 39 wherein the nested language information is stored in a linked list.

42. A method as set forth in claim 41 or claim 40, further comprising:
storing a current interaction language; and
setting the current interaction language responsive to a command by a user to invoke an application program using a desired interaction language to the desired interaction language if a message file containing messages in the desired interaction language is available; and
setting the current interaction language to a default interaction language if the desired interaction language is not available.

43. A method as set forth in claim 42, further including the steps of:
loading the message file for the current interaction language for the invoked application program; and
establishing a link in the link table for the loaded message file and the current interaction language.

44. A computer-implemented method for providing user interaction in multiple natural languages, in a computer system having a processor for executing an application program and a memory for storing at least one message file corresponding to the application program, each message file containing messages in one natural language, the application program further having a link table for storing a plurality of links between a plurality of application programs and a plurality of message files, each link storing values indicative of an application program, a natural language, and a pointer to a location in the memory of a message file for the application program and the natural language the method comprising the processor performing, external to the application program, the steps of:
loading the message file for the application program from a storage device into the memory; and
establishing a link in the link table, operative in response to the loading of a message file, between the application program, the pointer to the message file, and the natural language of messages in the message file.

45. A method as set forth in claim 44, further including the steps of:
instructing a processor to execute the application program;
selecting an interaction language; and
wherein said step of loading a message file, instructing, includes loading the corresponding message file responsive to an instruction to the processor for the selected interaction language.

46. A method as set forth in claim 45, further including step of storing a default language and wherein the step of instructing the processor includes specifying an intended interaction language, and the means for selecting an interaction language selects from the intended interaction language and the default interaction language.

47. A method as set forth in claim 46, wherein the step of instructing the processor to execute the application program is issued by another application program, and further including the steps:
storing a current interaction language;
storing nested language information; and
setting the current interaction language to the selected interaction language; and
storing a previous current interaction language responsive to an invokation of the application program with stored nested language information.

48. A method as set forth in claim 47, wherein the step of selecting the interaction language includes further selecting from the previous current interaction language.

49. A method as set forth in claim 48, further comprising the steps of:
selecting a natural language responsive to a command by the application program to retrieve a message, and
retrieving said message from the message file containing messages in the selected natural language.

50. A method as set forth in claim 49, wherein said step of selecting a natural language includes selecting from the current interaction language and the default language.

51. A method as set forth in claim 50, further including the steps of:
setting the current interaction language to the previous interaction language from stored nested language information responsive to a termination of the application program; and
removing the previous interaction language from the stored nested language information.

52. A method as set forth in claim 51 wherein the stored nested language information is a stored stack.

53. A method as set forth in claim 51 wherein the nested language information is stored in a linked list.

54. A computer-implemented method for providing interaction between a user and a plurality of nested application programs in multiple natural languages, the method comprising a processor performing the steps of:
assigning a current interaction language;
saving nested language information for the nested application programs in a memory;
executing a first nested application program interactive with the user in the current interaction language;
setting the current interaction language to a desired interaction language responsive to a command by a first nested application program to invoke a second nested application program;
saving a previous current interaction language for the first application program with the stored nested language information in the memory; and
executing the second nested application program interactive with the user in the desired interaction language.

55. A method as set forth in claim 54, further including the step of storing a default language, and wherein the step of setting the current interaction language to a desired interaction language includes selecting the desired interaction language from the current interaction language and the default language.

56. A method as set forth in claim 55, wherein:
said command to invoke the second nested application program includes an intended interaction language; and
said step of selecting the desired interaction language further includes selecting from the intended interaction language.

57. A method as set forth in claim 56, further including:
selecting a natural language from the current interaction language and the default language responsive to a command by an application program to retrieve a message and for retrieving said message from the message file containing messages in the selected natural language.

58. A method as set forth in claim 57, further including:

setting the current interaction language responsive to a termination of said second nested application program to the previous interaction language taken from the stored nested language information; and removing the previous interaction language from the stored nested language information.

59. A method as set forth in claim 58 wherein the means for storing nested language information is stored in a stack.

60. A method as set forth in claim 58 wherein the nested language information is stored in a linked list.

61. A data processing system providing interaction in multiple natural languages between a user and application programs, wherein an application program requests one of a plurality of messages from the user, comprising:

a processor for executing the application programs;

a memory for storing the application programs and data, the data in the memory including:

a plurality of message files, each message file including messages for one application program and one natural language, different message files being provided for different application programs and different natural languages; and a link table for storing a plurality of links between the application programs and the message files, wherein a link stores values indicative of an application program, a natural language, and a location of a message file associated with the application program and the natural language;

the processor including:

means, external to the application program, for retrieving a message from the message file, including means for searching the link table to find the link indicative of the location of the message file referenced by the application program and the selected natural language;

means, within the data processing system external to the application program, for determining whether the message and a user input match; and means, operative in response to a determination that the message and the user input match, for providing the message to the application program.

62. A data processing system as set forth in claim 61, wherein each message file contains messages in only one natural language.

63. A data processing system as set forth in claim 61, wherein the processor may execute a plurality of nested application programs, and further including:

means for storing language information for the nested application programs; and means, operative in response to the invoking of a second nested application program by a first nested application program, for saving a current interaction language in the means for storing nested language information, and for setting a new current interaction language to a desired interaction language.

64. A data processing system as set forth in claim 63, wherein the processor is controlled by an operating system which operates in response to instructions in the application program, and further including:

means for loading the message file for the desired interaction language and the second nested application program from a storage device into the memory; and in the operating system, means for establishing a link in the link table responsive to the loading of a message file.

65. A data processing system as set forth in claim 64, further including means for selecting the desired interaction language from the current interaction language and a default interaction language.

66. A data processing system as set forth in claim 65, wherein:

said command to invoke the second nested application program includes specifying an intended interaction language; and said means for selecting the desired interaction language further selects from the intended interaction language.

67. A data processing system as set forth in claim 66, further including:

means, operative in response to a termination of the second nested application program, for setting the current interaction language to a previous interaction language specified in the means for storing nested language information; and means for removing the previous interaction language from the means for storing nested language information.

68. A data processing system as set forth in claim 67 wherein the means for storing nested language information is a stack.

69. A data processing system as set forth in claim 67 wherein the means for storing nested language information is a linked list.

70. A data processing system as set forth in claim 61, wherein said means for selecting a natural language is responsive to a command by a user to invoke an application program, using a desired interaction language for setting the current interaction language to the desired interaction language, if a message file containing messages in the desired interaction language is available, and for setting the current interaction language to a default interaction language, if the desired interaction language is not available.

71. A data processing system as set forth in claim 70, wherein the processor is controlled by an operating system which operates in response to instructions in an application program, and further including:

means for loading the message file for the selected natural language for the second nested application program from the storage device into the memory; and in the operating system, means for establishing a link in the link table responsive to the loading of a message file.

72. A computer-implemented method for providing user interaction in multiple natural languages between a computer and a user, the computer having an application program, a selected natural language, and a memory for storing at least one message file, a message file containing messages for the application program and the selected natural language, different message files being provided for different application programs and different natural languages, the computer obtaining an input for the application program by performing the steps of:
  locating the message file containing messages for the application program and the selected natural language;
  accepting a user input;
  comparing, external to the application program, the user input with the messages in the message file;
  finding, external to the application program, a message in the message file that matches the user input; and
  transferring the located message from the message file to the application program as the input for the application program.

73. A method as set forth in claim 72, wherein the computer comprises a link table for storing a plurality of links, each link comprising values indicative of an application program, a natural language, and a location in the memory of a message file for the application program and the natural language,
  wherein said step of locating includes the step of searching the link table for the link for the application program and the selected natural language to obtain the value indicative of the location of the message file in the memory.

74. A method as set forth in claim 73, further including the steps of:
  storing a current interaction language in the memory; and
  storing a default language in the memory;
  selecting between the current interaction language and the default language to obtain the selected natural language.

75. A method as set forth in claim 72, further including the steps of:
  storing nested language information; and
  setting the current interaction language to a desired interaction language in response to a command by the application program to invoke a second application program, and
  saving a previous current interaction language with the stored nested language information.

76. A method as set forth in claim 75 further including
  loading a message file containing messages for the second application program and the selected natural language, into the memory; and
  establishing a link in the link table in response to the loading of the message file.

77. A system for providing interaction in a plurality of natural languages between a plurality of users and a plurality of private application programs, the private application programs each supplying requests for messages, comprising:
  a processor for executing the private application programs;
  a memory, coupled to the processor, for storing the private application programs and data, the data in the memory including:
    a plurality of message files, a message file including messages for one of the private application programs in one natural language;
    a plurality of private link tables, a different private link table being provided for each user, each private link table including a plurality of links, wherein a link includes values indicative of a private application program, a natural language, and a location in the memory of the message file for the private application program and the natural language;
  the processor further including:
    means for selecting a natural language for each of the plurality of users on a per-user basis; and
    means, external to the private application programs and responsive to a request for a message from a private application program invoked by a user, for finding the link in the private link table for the user, indicative of the requesting private application program and the selected natural language for the user, accessing the message file indicated by the found link, and obtaining a message from the message file.

78. The system of claim 77, wherein the processor further executes a plurality of shared application programs each supplying requests for messages,
  the data in the memory further comprising:
    a shared link table provided for all the plurality of users, the shared link table including a plurality of links between the shared application programs and message files in at least one natural language, each link including values indicative of a shared application program, a natural language, and a location in the memory of the message file for the shared application program and the natural language;
  and the processor further comprising:
    means, external to the private and shared application programs and responsive to a request for a message from one of the shared application programs, for finding the link in the shared link table indicative of the requesting shared application program and a selected natural language, accessing the message file indicated by the found link, and obtaining a message from the message file; and
    means for transferring the obtained message from the message file to one of the shared application program and the user, responsive to the request for the message being for one of input and output, respectively.

79. The system of claim 77, further comprising:
  a non-volatile storage device;
  means, external to the private application programs, for loading a message file from the non-volatile storage device into the memory; and
  means, operative in response to the loading of a message file, for establishing a link in the private link table indicative of a private application program and a selected natural language for a user.

80. The system of claim 77, further including:
  in the memory, a nested language information table for maintaining a correspondence between at least one of the private application programs and a natural language in which the at least one of the private application programs is to interact with the user;
  and the processor further including:
    means for invoking a second private application program by a first private application program invoked by the user;
    means, operative in response to invoking the second private application program, for saving a first selected language for the first private application program in the nested language information table; and means for selecting a second natural language for interaction between the user and the second private application program.

81. The system of claim 80, further comprising means, in the processor, for resuming operation of the first private application program upon a completion of the second private application program, including means for retrieving the saved first selected language from the nested language information table.

* * * * *